United States Patent
Raymond et al.

(10) Patent No.: US 7,081,759 B2
(45) Date of Patent: Jul. 25, 2006

(54) FLUID DETECTION CABLE

(75) Inventors: Donald M. Raymond, Fort Collins, CO (US); Donald A. Raymond, Fort Collins, CO (US); Jeffrey W. Whitham, Fort Collins, CO (US)

(73) Assignee: Raymond & Lae Engineering, Inc., Fort Collins, CO (US)

( * ) Notice: Subject to any disclaimer, the term of this patent is extended or adjusted under 35 U.S.C. 154(b) by 0 days.

(21) Appl. No.: 11/000,636

(22) Filed: Nov. 30, 2004

(65) Prior Publication Data

US 2005/0116725 A1    Jun. 2, 2005

Related U.S. Application Data

(60) Provisional application No. 60/526,203, filed on Dec. 1, 2003.

(51) Int. Cl.
G01R 31/02 (2006.01)

(52) U.S. Cl. .................. 324/539; 324/449; 324/544

(58) Field of Classification Search ............... 324/539
See application file for complete search history.

(56) References Cited

U.S. PATENT DOCUMENTS

| | | | | |
|---|---|---|---|---|
| 3,662,367 | A | * | 5/1972 | De Veau et al. ............ 340/604 |
| 3,981,181 | A | | 9/1976 | Ochiai |
| 4,029,889 | A | | 6/1977 | Mizuochi |
| 4,206,402 | A | | 6/1980 | Ishido |
| 4,386,231 | A | * | 5/1983 | Vokey ..................... 174/115 |
| 4,594,638 | A | * | 6/1986 | Suzuki et al. ............. 361/280 |
| 4,797,621 | A | | 1/1989 | Anderson et al. |
| 4,843,327 | A | | 6/1989 | Koppitsch et al. |
| 4,862,146 | A | | 8/1989 | McCoy et al. |
| 4,910,998 | A | | 3/1990 | Willis et al. |
| 4,922,183 | A | | 5/1990 | Kamas |
| 4,926,129 | A | | 5/1990 | Wasley et al. |
| 4,931,741 | A | | 6/1990 | Koppitsch et al. |
| 4,949,076 | A | | 8/1990 | Wann |
| 4,970,466 | A | | 11/1990 | Bolles et al. |

(Continued)

FOREIGN PATENT DOCUMENTS

EP    0354733    9/1989

(Continued)

OTHER PUBLICATIONS

Website www.darwell.com.

(Continued)

*Primary Examiner*—Diane Lee
*Assistant Examiner*—John Zhu
(74) *Attorney, Agent, or Firm*—Cochran Freund & Young LLC; William W. Cochran

(57) ABSTRACT

A fluid detection cable is described for use in detecting the presence of leaks in areas where a particular fluid is not desired. Sensing leads in the fluid detection cable have a center conductor that may be surrounded with a non-porous conductive polymer coating that protects the conductors from corrosive fluids. A non-conductive polymer at least partially surrounds the sensing leads so that a fluid transmission pat allows fluid to contact the conductive polymer. The non-conductive polymer may be porous to provide a fluid transmission path. Fluid transmission paths may also be structurally formed in the non-conductive polymer. The non-conductive polymer protects the sensing leads from false alarms that would occur if the conductive polymer were to be in contact with non-fluid conductive surfaces. The cable may also include monitor leads that are conductors coated with, or embedded in, non-conductive non-porous polymers.

23 Claims, 35 Drawing Sheets

U.S. PATENT DOCUMENTS

| | | |
|---|---|---|
| 5,015,958 A | 5/1991 | Masia et al. |
| 5,134,377 A | 7/1992 | Reddy, III. et al. |
| 5,136,249 A | 8/1992 | White et al. |
| 5,144,250 A | 9/1992 | Little |
| 5,159,276 A | 10/1992 | Reddy, III |
| 5,172,730 A | 12/1992 | Driver |
| 5,177,996 A * | 1/1993 | Sahakian .................. 73/40 |
| 5,203,202 A | 4/1993 | Spencer |
| 5,235,286 A | 8/1993 | Masia et al. |
| 5,334,970 A | 8/1994 | Bailey |
| 5,355,720 A | 10/1994 | Bailey |
| 5,381,097 A | 1/1995 | Takatori et al. |
| 5,402,828 A | 4/1995 | Pino |
| 5,410,255 A * | 4/1995 | Bailey .................. 324/525 |
| 5,918,267 A | 6/1999 | Evans et al. |
| 6,144,209 A | 11/2000 | Raymond et al. |
| 6,175,310 B1 | 1/2001 | Gott |
| 6,526,807 B1 * | 3/2003 | Doumit et al. ........... 73/40.5 R |
| 6,734,364 B1 * | 5/2004 | Price et al. ............. 174/117 F |
| 6,777,947 B1 * | 8/2004 | McCoy et al. ............. 324/449 |
| 2002/0071113 A1 | 6/2002 | Moran et al. |
| 2005/0115664 A1 * | 6/2005 | Musahl et al. ............. 156/212 |

FOREIGN PATENT DOCUMENTS

| | | |
|---|---|---|
| FR | 2709347 | 8/1993 |

OTHER PUBLICATIONS

Website www.permapipe.com.

* cited by examiner

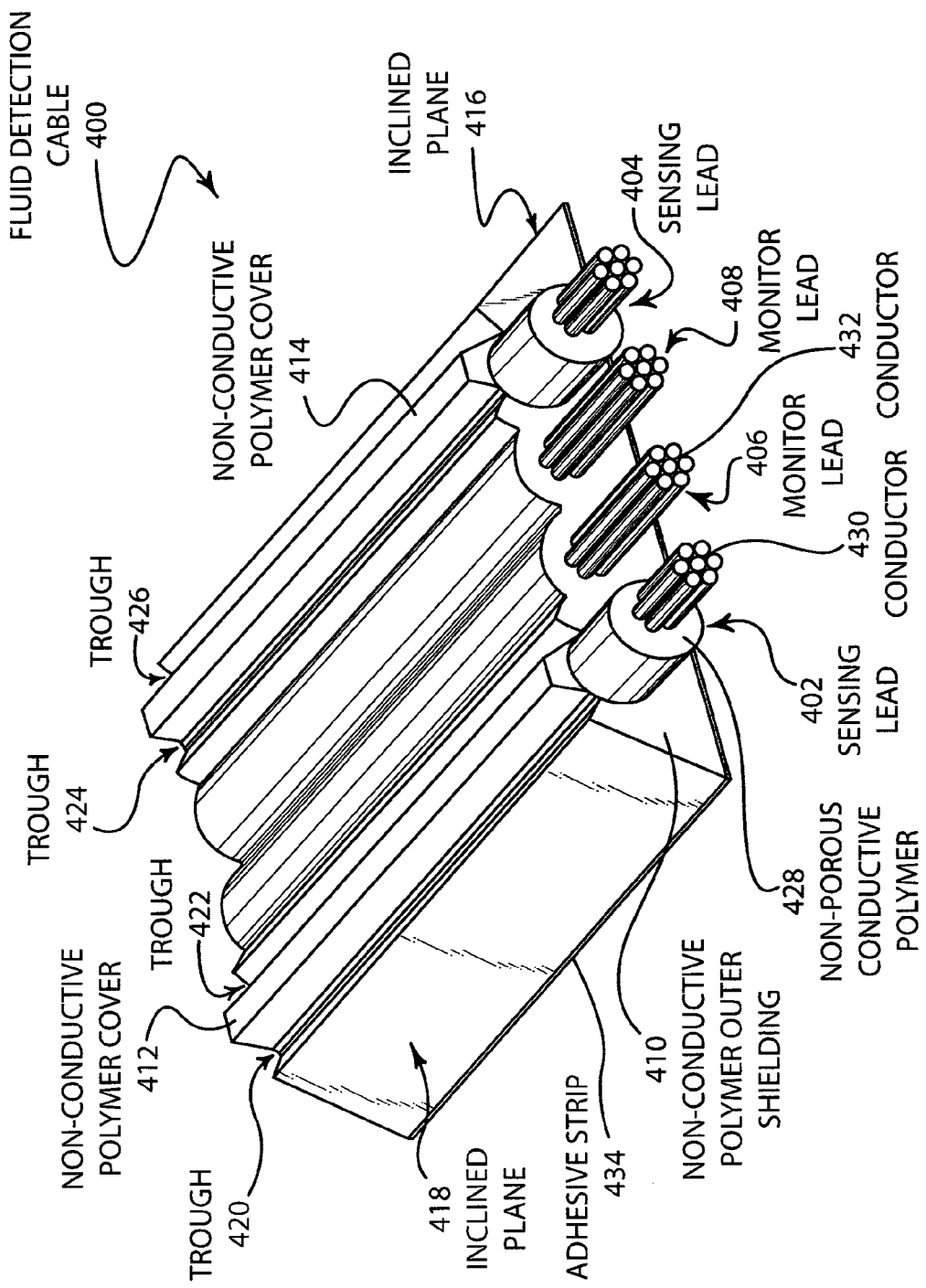

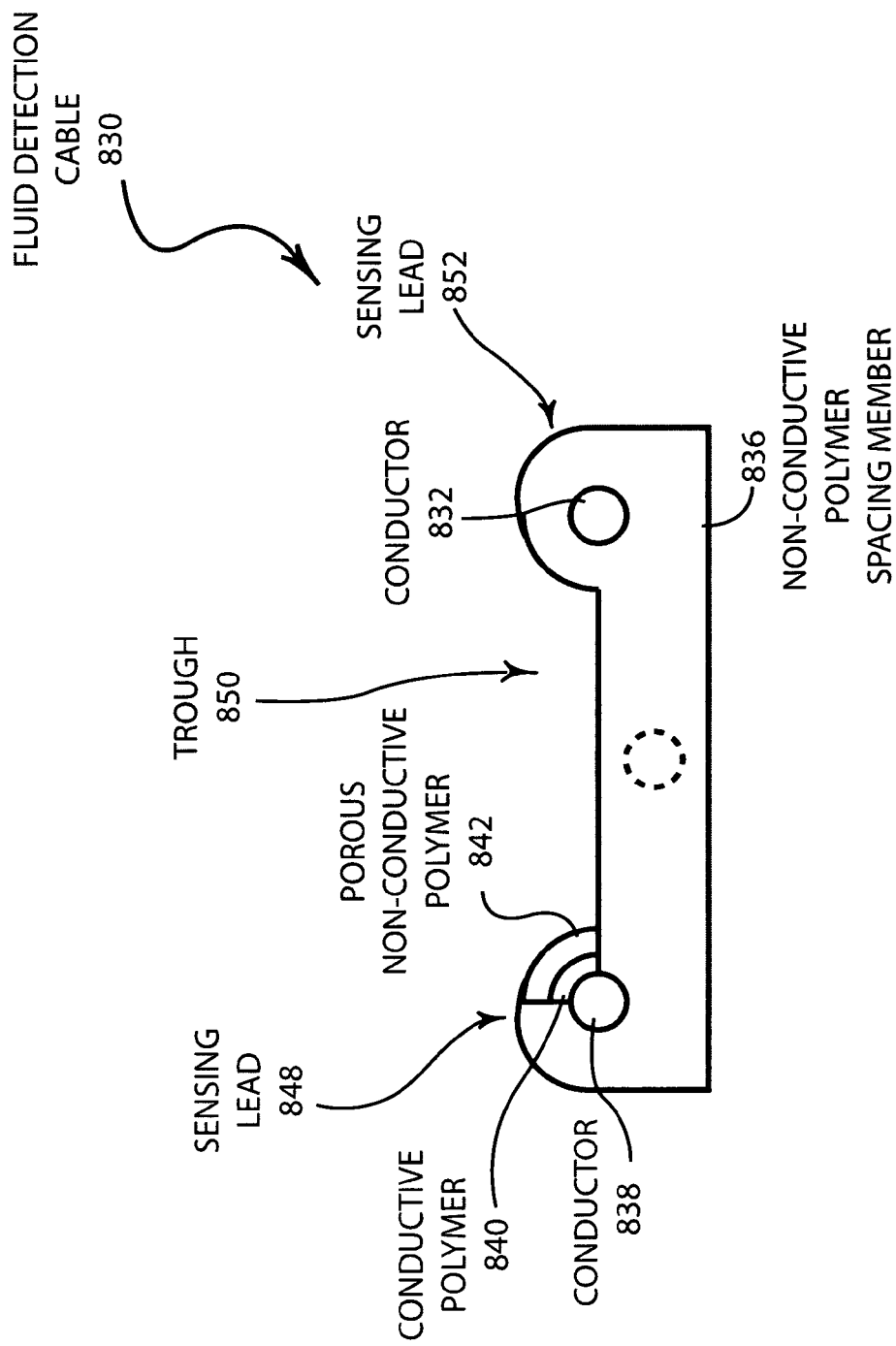

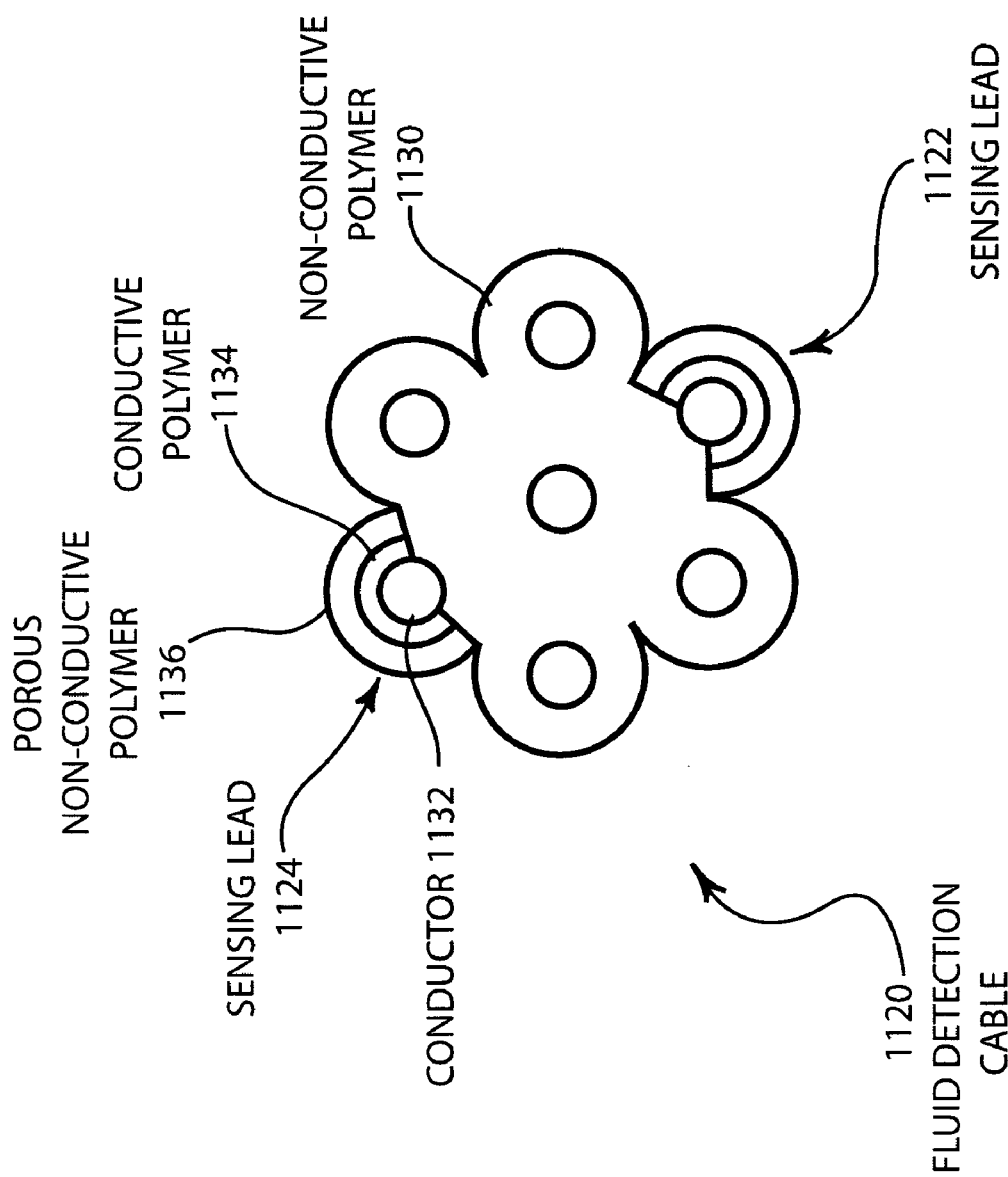

FLUID DETECTION CABLE

CROSS REFERENCE TO RELATED APPLICATIONS

This application is based upon and claims the benefit of U.S. provisional application No. 60/526,203, entitled "Fluid Detection Cable", filed Dec. 1, 2003, the entire disclosure of which is hereby specifically incorporated by reference for all that it discloses and teaches.

BACKGROUND OF THE INVENTION a. Field of the Invention

The present invention pertains generally to fluid detection and, more particularly, to the use of cables for detection of the presence of fluids.

b. Background of the Invention

Cabled sensors and cables have been used in the detection of the presence of fluids. In many applications, it is desirable not only to detect the presence of fluids, but also to determine the location of a fluid.

The ruggedness and durability of the cable used is important. For example, in industrial, commercial or residential applications, movement of people or objects above or near the cables may result in breakage or disconnection of the cable. Hence, fluid detection cables need to be sufficiently rugged to minimize potential breakages or disconnections.

In some cases, placement of a structure or object near or on top of the cable may cause a malfunction of the fluid detection system either with a false detection when no fluid is present, or failure to detect a fluid when one is present. Some existing cables have a disadvantage when used around metal structures or other conductive materials since contact with conductive surfaces can form a short circuit across the sensing leads of the cables which can cause a false alarm in the fluid detection system. In existing fluid detection cables, certain conductive elements (e.g. conductors) of the cable must make contact with the fluid to detect the presence of the fluid. In some cases the construction of the cable is such that sensing leads are not disposed to immediately sense small amounts of fluid. A fluid may be present, but the level of the fluid may be too low to be in contact with the sensing leads. Hence, these cables do not detect fluids until the level of the fluid is sufficiently high.

Fluid detection cables that are too big or that have the wrong shape, may also negatively impact the site where they are installed. For example, many round fluid detection cables have a diameter of ¼ inch or more. Installation of such cables below a carpet or other floor covering creates a trip hazard or at a minimum an unsightly bump.

Another problem with previous fluid detection cables is that the size of the cable makes it difficult to install the cable in tight places. For example, in the construction of a building, it may be desirable to install fluid detection cables directly adjacent to or along the bottom of a wall or in other tight spaces. Existing cables are too large, or the wrong shape, and thus are not suitable for use.

Installation of fluid detection systems with cables into environments where equipment, floor coverings, or other structures are already in place may be difficult or impossible, due to the size and the shape of the cable, and the size and shape of the connecters.

Another problem with existing fluid detection cables is that when a leak or other contact of the cable with fluid occurs, it is necessary to dry the cable in order for the system to properly function again. Many cables are constructed with hygroscopic materials, i.e., materials that absorb moisture, or act as a wick to draw in and retain fluids. Drying of these cables to return them to the normally dry state required for fluid detection may require removal of the cable from the installed site followed by heating or blowing the cable for a period of time until the moisture has evaporated. Removal and reinstallation of the cable from an installed site may be difficult and time consuming. In some situations the cable can be dried without removing it, but the drying process is time consuming and may damage the cable by heating it. Also, some fluid detection cables require a fastener to secure the cable. Such fasteners must be placed at regular intervals. Other fluid detection cables must be glued to the floor. Such fastening of the cables with certain shapes and sizes may be necessary for proper function, but it makes removal and drying time consuming and difficult. When the cable is fastened to a surface, the use of large or expensive connectors at the ends of the cable makes cutting the connectors from the ends of the cable in order to remove it by pulling it through the fasteners difficult and costly.

Further, existing fluid detection cables and connectors require expensive materials. As a result, the cost of a fluid detection system is high, especially for residential applications or other applications requiring relatively low cost.

SUMMARY OF THE INVENTION

The various embodiments of the present invention overcome the disadvantages and limitations of the prior art by providing an improved fluid detection cable and system.

The invention may therefore comprise a flat four-conductor fluid detection cable comprising: a first sensing lead that has a center conductor that is at least partially surrounded by a conductive polymer and a porous non-conductive polymer that at least partially surrounds the conductive polymer, the porous non-conductive polymer providing an insulating layer at least partially surrounding the conductive polymer; a first monitor lead that has a center conductor that is surrounded by a non-conductive polymer, the first monitor lead disposed adjacent and joined to the first sensing lead; a second monitor lead that has a center conductor that is surrounded by a non-conductive polymer, the second monitor lead disposed adjacent and joined to the first monitor lead; and a second sensing lead that has a center conductor that is at least partially surrounded by a conductive polymer and a porous non-conductive polymer that at least partially surrounds the conductive polymer, the porous non-conductive polymer providing an insulating layer at least partially surrounding the conductive polymer; the second sensing lead disposed adjacent and joined to the second monitor lead.

The invention may further comprise a flat four-conductor fluid detection cable comprising: a first sensing lead that has a center conductor that is at least partially surrounded by a conductive polymer and a non-conductive polymer shielding that partially surrounds the conductive polymer; a first non-conductive polymer cover that partially covers a selected side of the conductive polymer of the first sensing lead so that the first non-conductive polymer cover and the non-conductive polymer shielding form at least one trough, the trough providing a fluid transmission path that allows a fluid to electrically contact the conductive polymer by passing between the non-conductive polymer shielding and the non-conductive polymer cover, the non-conductive polymer shielding and the non-conductive polymer cover positioned so that electrical contact of a solid object with the conductive polymer is inhibited; at least one monitor lead that has a center conductor, the monitor lead surrounded by the non-conductive polymer outer shielding; a second sensing lead that has a center conductor that is at least partially surrounded by a conductive polymer and a non-conductive polymer shielding that partially surrounds the conductive polymer; a second non-conductive polymer cover that partially covers a portion of the conductive polymer of the second sensing lead so that the second non-conductive polymer cover and the non-conductive polymer shielding form at least one trough, the trough providing a fluid transmission path that allows a fluid to electrically contact the conductive polymer by passing between the non-conductive polymer shielding and the second non-conductive polymer cover, the non-conductive polymer shielding and the second non-conductive polymer cover positioned so that electrical contact of a solid object with the conductive polymer is inhibited.

The invention may further comprise a fluid detection cable comprising: a first sensing lead that has a center conductor that is at least partially surrounded by a conductive polymer and a non-conductive polymer that at least partially surrounds the conductive polymer, the non-conductive polymer providing a fluid transmission path that permits fluid to make electrical contact with the conductive polymer, the non-conductive polymer formed so that electrical contact of a solid object with the conductive polymer is inhibited; a second sensing lead that has a center conductor that is at least partially surrounded by a conductive polymer and a non-conductive polymer that at least partially surrounds the conductive polymer, the non-conductive polymer providing a fluid transmission path that permits fluid to make electrical contact with the conductive polymer, the non-conductive polymer formed so that electrical contact of a solid object with the conductive polymer is inhibited.

The invention may further comprise a fluid detection cable comprising: a first sensing lead that has a center conductor that is at least partially surrounded by a conductive polymer and a porous non-conductive polymer that at least partially surrounds the conductive polymer, the porous non-conductive polymer providing an insulating layer at least partially surrounding the conductive polymer; a non-conductive polymer spacing member adjacent and joined to the first sensing lead; and a second sensing lead that has a center conductor that is at least partially surrounded by a conductive polymer and a porous non-conductive polymer that at least partially surrounds the conductive polymer, the porous non-conductive polymer providing an insulating layer at least partially surrounding the conductive polymer, the second sensing lead disposed adjacent and joined to the spacing member.

The invention may further comprise a fluid detection cable comprising: a first sensing lead that has a center conductor that is at least partially surrounded by a conductive polymer and a porous non-conductive polymer that at least partially surrounds the conductive polymer, the porous non-conductive polymer providing an insulating layer at least partially surrounding the conductive polymer; a non-conductive polymer spacing member adjacent and joined to the sensing lead; and a second sensing lead that has a center conductor and is surrounded by a non-conductive polymer, the non-conductive polymer having a thickness and a dielectric constant that permits the presence of a fluid to be detected by detecting a change in the dielectric constant at the location of the fluid, the second sensing lead and the first sensing lead adjacent and joined to the spacing member so as to form a trough that is capable of collecting fluid.

The invention may further comprise a method of detecting a fluid comprising: placing a fluid detection cable comprising two sensing leads, the sensing leads having a center conductor surrounded by a porous non-conductive polymer, the porous non-conductive polymer providing an insulating layer surrounding the conductor, adjacent to a surface that is to be monitored for the presence of a fluid, and monitoring the fluid detection cable.

The invention may further comprise a method of detecting a fluid comprising: providing a fluid detection cable that has two sensing leads, the sensing leads having a center conductor that is at least partially surrounded by a conductive polymer and a non-conductive polymer shielding that partially surrounds the conductive polymer, the non-conductive polymer shielding having at least one fluid transmission path that permits fluid to electrically contact the conductive polymer; installing the fluid detection cable adjacent to a surface that is to be monitored for the presence of a fluid; and providing a monitor for monitoring the fluid detection cable.

The invention may further comprise a method of detecting a fluid comprising: providing a fluid detection cable that has two sensing leads, the sensing leads having a center resistive conductor that is at least partially surrounded by a non-conductive polymer shielding, the non-conductive polymer shielding having at least one fluid transmission path that permits fluid to electrically contact the conductor; installing the fluid detection cable adjacent to a surface that is to be monitored for the presence of a fluid; and providing a monitor for monitoring the fluid detection cable.

BRIEF DESCRIPTION OF THE DRAWINGS

FIG. 4A is an oblique view of another embodiment of a flat fluid detection cable without a porous non-conductive polymer coating.

FIG. 8B is a cross-sectional view of another embodiment of a flat fluid detection cable.

FIG. 11B is a cross-sectional view of a multi-conductor embodiment of a fluid detection cable.

DETAILED DESCRIPTION OF THE INVENTION

Figure 1:
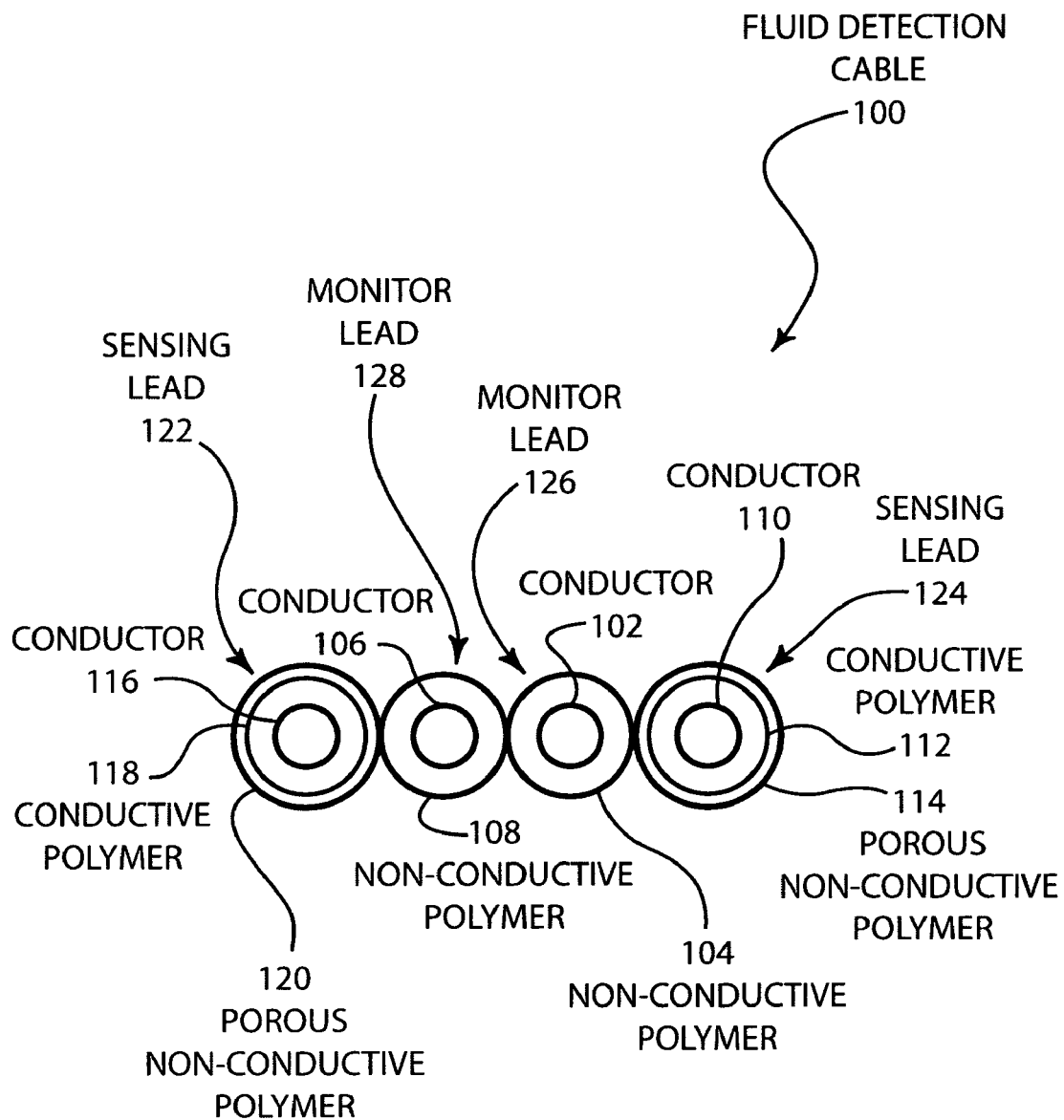
FIG. 1 is a cross-sectional view of a four-conductor flat fluid detection cable.

FIG. 1 is a cross-sectional view of a four-conductor flat fluid detection cable 100. The fluid detection cable 100 includes a first sensing lead 124. The first sensing lead has a center conductor 110. The center conductor 110 may be made of copper, stainless steel or other conductive materials including non-metallic conductors, such as graphite fibers. Alternatively, the center conductor may be a resistive material, such as Chromel or other conductive materials that have additives that increase the resistance. Resistive conductors enable fluid detection systems to determine the location of a fluid as described below. Resistive conductors are available from Bob Martin Company, South El Monte, Calif. Resistive conductors that have a resistance in the range of 2 to 3 ohms per foot are well suited for use in systems that use resistance to determine the location of a fluid. However, resistive conductors with any desired resistance may be used.

The center conductor 110, shown in FIG. 1, is surrounded by a conductive polymer 112. The conductive polymer 112 is non-porous and protects the center conductor 110 from corrosion in the presence of corrosive fluids. The conductive polymer 112 is coated with a porous non-conductive polymer 114. The porosity of the porous non-conductive polymer 114 allows water and other fluids to penetrate and make electrical or ionic contact with the conductive polymer 112. The porous non-conductive polymer 114 also insulates the inner conductive polymer 112 from making electrical contact with non-liquid conductive surfaces such as pipes, conductive computer room subfloors, appliances or other conductive surfaces. Porous polymer jackets for conductors can be obtained from Northwire, Inc., Osceola, Wis. and Putnam Plastics, Dayville, Conn. Porous non-conductive polymers provide a fluid transmission path that permits fluid to pass through the non-conductive polymer and to make electrical contact or ionic contact with a conductive polymer or a conductor that is covered the porous non-conductive polymer and at the same time the porous non-conductive polymer does not permit solids to make electrical contact with a conductive polymer or conductor that is surrounded by the porous non-conductive polymer. In other embodiments, the fluid transmission path through the non-conductive polymer may be long continuous slots in a trough formed by the physical structure of the non-conductive polymer, so that the fluid transmission path permits fluids, but not solids, to pass. In the various embodiments of the invention, each sensing lead may have a porous fluid transmission path or a structural fluid transmission path or both. The fluid transmission path for one sensing lead may differ from the fluid transmission path of other sensing leads.

Adjacent and joined to the first sensing lead 124, is a first monitor lead 126. The first monitor lead 126 has a center conductor 102 that may be made of copper or other conductive materials. Conductors used in either the sensing leads or the monitor leads may be solid or stranded. The conductors may be made of other conductive materials including conductive polymers, graphite fibers or any conductive material. The center conductor 102 is surrounded by a non-conductive polymer 104. The non-conductive polymer 104 acts as a protective insulator for conductor 102. Adjacent and joined to the first monitor lead 126 is a second monitor lead 128. The second monitor lead 128 has a center conductor 106 that is surrounded by a non-conductive polymer 108. Joined and adjacent to the second monitor lead 128 is a second sensing lead 122. The second sensing lead has a center conductor 116 that is surrounded by a conductive polymer 118. The conductive polymer 118 is surrounded by a porous non-conductive polymer 120. Within this disclosure, polymers may be any flexible plastic-like or rubber-like material. All polymer coatings or structures in the drawings herein are non-porous unless specifically labeled as porous. Polymers used in the various embodiments may be made of halogen free material to meet environmental requirements in certain applications.

One of the advantages that various embodiments of fluid detection cable provide over existing cables is that these embodiments provide a fluid detection cable that does not short circuit or falsely sense a fluid when in contact with non-liquid conductive surfaces and at the same time is flat or has a small diameter, can be formed into a tight loop, and can be installed in, or removed from, tight places. The thickness of the various polymer coatings and the size of the conductors of some embodiments of the fluid detection cable, as described, are exemplary only, and should not be considered as limiting the claims. In one embodiment, the thickness of the first conductive polymer layer may be, e.g., 5 mils thick and the outer porous non-conductive polymer coating may be, e.g., 5 mils thick. The non-conductive polymer used to insulate the monitor leads may be, e.g., 20 mil thick. The conductors may be e.g., about 22 gauge or 24 gauge. Using conductors and coatings of the thickness mentioned allows the height of the cable to be approximately 0.1 inches or less. The sensing leads and the monitor leads can be arranged in a flat, ribbon configuration, which facilitates the flatness of the fluid detection cable. Arrangements in which a monitor lead or a spacing member is disposed between the sensing leads eliminates the need to ensure that any fluid in the porous polymer jacket of the sensing leads is dried following contact with a fluid. The monitor leads or spacing member may be wiped dry and thus eliminate the presence of conductive fluids between the sensing leads. However, any desired arrangement and/or order can be used in accordance with the invention. For example, other embodiments of the invention may use at least two sensing leads each with an exterior non-conductive polymer coating that is porous that provides a fluid transmission path. Fluid transmission paths may also be structurally formed in the non-conductive polymer coating. Other embodiments may have one or more monitor leads joined in an arrangement with the sensing leads that have a porous non-conductive outer jacket.

Fluid detection cables are used to detect the presence of leaks or other fluids using a variety of electronic means, some of which are described in U.S. Pat. No. 6,144,209, Raymond et al., which is specifically incorporated herein by reference for all that it discloses and teaches. Examples of the types of systems frequently used to monitor and detect leaks or other fluids are zone systems, distance read (also called direct read) and Time-Domain Reflectometry (herein referred to as TDR) systems. In zone systems, the length of the cable may range from a few feet to more than 1000 feet. Further, the conductors of the sensing leads need not be resistive in a zone system. The location of the fluid in a zone system is determined by zone rather than trying to pinpoint a distance from the controller to the point of contact of the fluid with the cable. In distance read systems (sometimes referred to as direct read systems), a sensing lead with a resistive center conductor is electrically connected to a monitor lead at the end of the cable farthest from the controller. The sensing lead and the monitor lead at the end of the cable nearest, or internal to, the controller may be connected to a constant current source in the controller. A second sensing lead is connected to a second monitor lead at the end of the cable farthest from the controller and the ends of the sensing lead and the monitor lead nearest, or internal to, the controller may be connected to a voltage measuring device. Presence of water or other conductive fluid forms a conductive path from the sensing lead connected to the current source to the sensing lead connected to the voltage-measuring device. The distance from the controller to the point of contact of the sensing leads with a fluid can be calculated by deriving the resistance required to produce the measured voltage and calculating the length of cable that has the required resistance. Monitor leads may be used as a conductive path for connecting the sensing leads to the controller. Further, monitor leads may be used as a means of checking the electrical continuity of a cable. Monitor leads and sensor leads may also be used to carry other desired electrical signals such as communication and power signals to distributed electronic devices.

Figure 2:
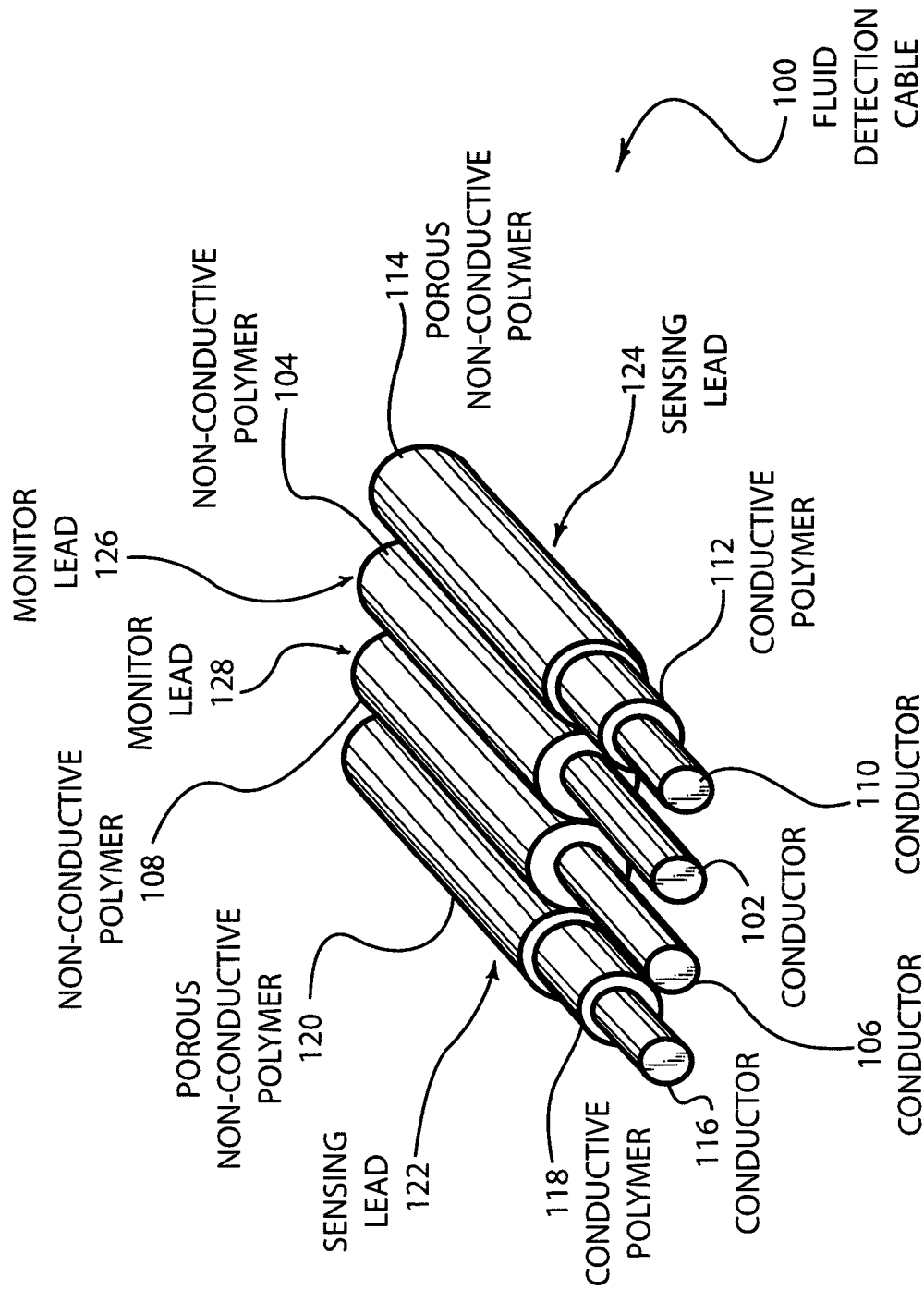
FIG. 2 is an oblique view of a four-conductor flat fluid detection cable.

FIG. 2 is an oblique view of the fluid detection cable 100 described in FIG. 1. The fluid detection cable 100 includes a first sensing lead 124 that has a center conductor 110. The center conductor 110 is surrounded by a conductive polymer 112. The conductive polymer is coated with a porous non-conductive polymer 114. Adjacent and joined to the first sensing lead 124 is a first monitor lead 126 that has a center conductor 102. The center conductor 102 is surrounded with a non-conductive polymer 104. Adjacent and joined to the first monitor lead 126 is a second monitor lead 128 that has a center conductor 106. The center conductor 106 is surrounded with a non-conductive polymer 108. Adjacent and joined to the second monitor lead 128 is a second sensing lead 122. The second sensing lead 122 has a center conductor 116. The center conductor 116 is surrounded by a conductive polymer 118. The conductive polymer 118 is concentrically surrounded with a porous non-conductive polymer 120.

Figure 3A:
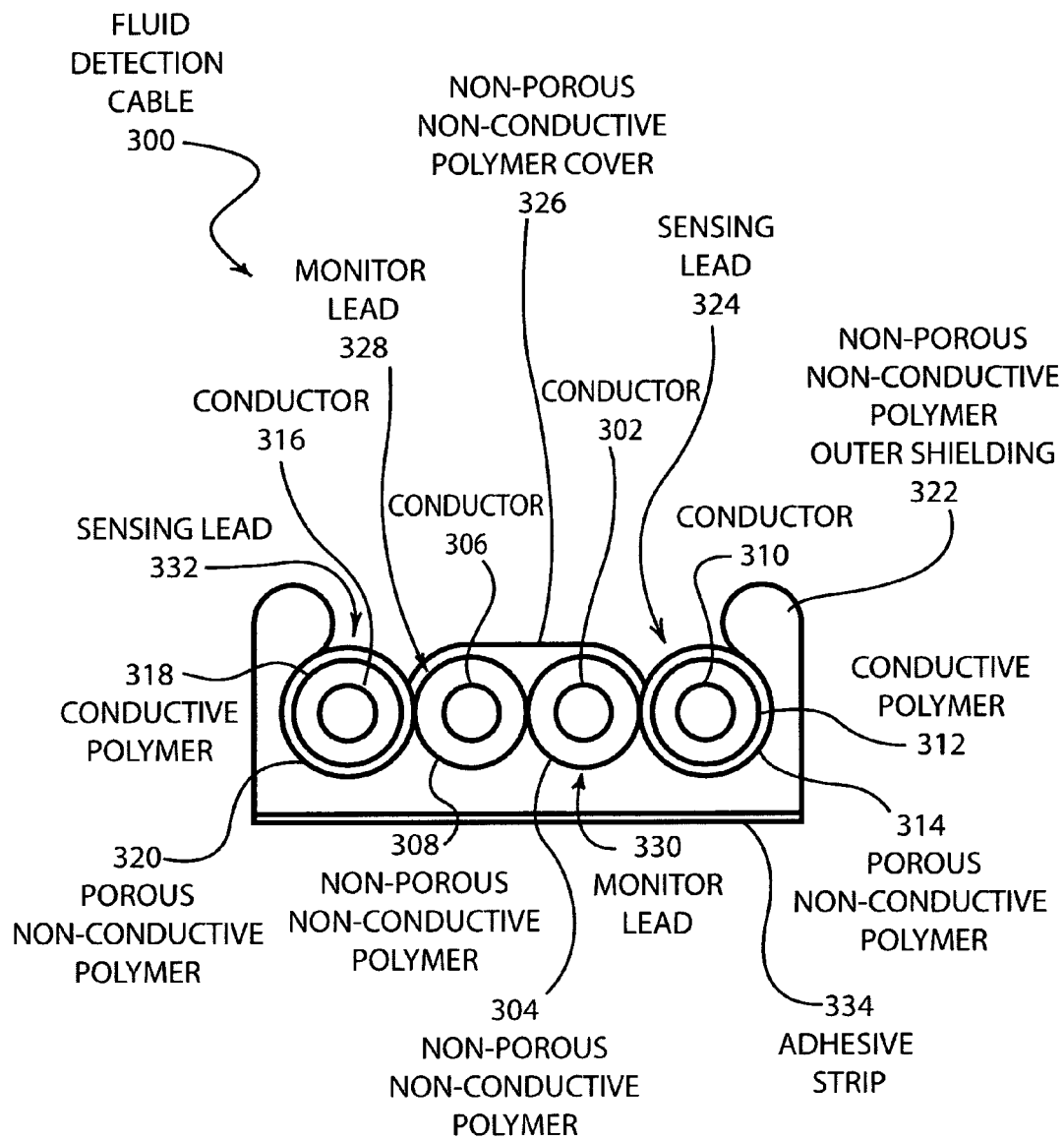
FIG. 3A is a cross-sectional view of a flat fluid detection cable with a porous non-conductive polymer coating.

FIG. 3A is a cross-sectional view of a four-conductor flat fluid detection cable 300 with a non-conductive polymer outer shielding 322 that forms a trough that is capable of collecting fluid. The fluid detection cable 300 includes a first sensing lead 324. The first sensing lead has a center conductor 310. The center conductor 310 may be made of copper, stainless steel or other conductive materials as disclosed above with respect to FIG. 1. Alternatively the center conductor may be of resistive material as described above. The center conductor 310 is at least partially surrounded by a conductive polymer 312. The conductive polymer 312 is non-porous and protects the center conductor 310 from corrosion in the presence of corrosive fluids. The conductive polymer 312 is coated with a porous non-conductive polymer 314. The porosity of the porous non-conductive polymer 314 allows water and other fluids to penetrate and make electrical or ionic contact with the conductive polymer 312. The porous non-conductive polymer 314 also insulates the inner conductive polymer 312 from making electrical contact with non-liquid surfaces that are conductive such as pipes, conductive computer room subfloors, appliances or other conductive surfaces. Adjacent and joined to the first sensing lead 324 is a first monitor lead 330. The first monitor lead 330 has a center conductor 302 that may be made of copper or other conductive materials. The center conductor 302 is surrounded by a non-conductive polymer 304. The non-conductive polymer 304 acts as a protective insulator for conductor 302. Adjacent and joined to the first monitor lead 330 is a second monitor lead 328. The second monitor lead 328 has a center conductor 306 that is surrounded by a non-conductive polymer 308. The two monitor leads 330 and 328 are covered by a non-porous non-conductive cover 326. The non-porous non-conductive polymer cover 326 dries easily when wiped thus facilitating quick and easy drying of an installed cable or an uninstalled cable. Adjacent and joined to the second monitor lead 328 is a second sensing lead 332. The second sensing lead has a center conductor 316 that is at least partially surrounded by a conductive polymer 318. The conductive polymer 318 is surrounded by a porous non-conductive polymer 320. Adjacent and joined to the sensing leads 324 and 332 and the monitor leads 330 and 328, is a non-porous non-conductive polymer outer shielding 322. Any desired arrangement of the sensing leads 324 and 332 and the monitor leads 330 and 328 may be made as disclosed above with respect to FIG. 1.

FIG. 3A further illustrates an optional adhesive strip 334 that is joined to the non-conductive outer shielding 322. The adhesive strip may be used to attach the fluid detection cable 300 to a surface. A similar adhesive strip may be used with any of the embodiments of the invention.

In the fluid detection systems described herein and in other systems, the non-conductive porous polymer outer coating of the sensing leads protects the cable from short circuits when the cable contacts non-liquid surfaces that are conductive. The non-porous non-conductive shielding 322 forms a trough that is capable of collecting fluids.

For detecting conductive fluids such as water, the fluid detection cable 300 may be used with a Time-Domain Reflectometry fluid detection system, herein referred to as a TDR system. Additional details relating to the use of the fluid detection cable in TDR systems are described below.

Figure 3B:
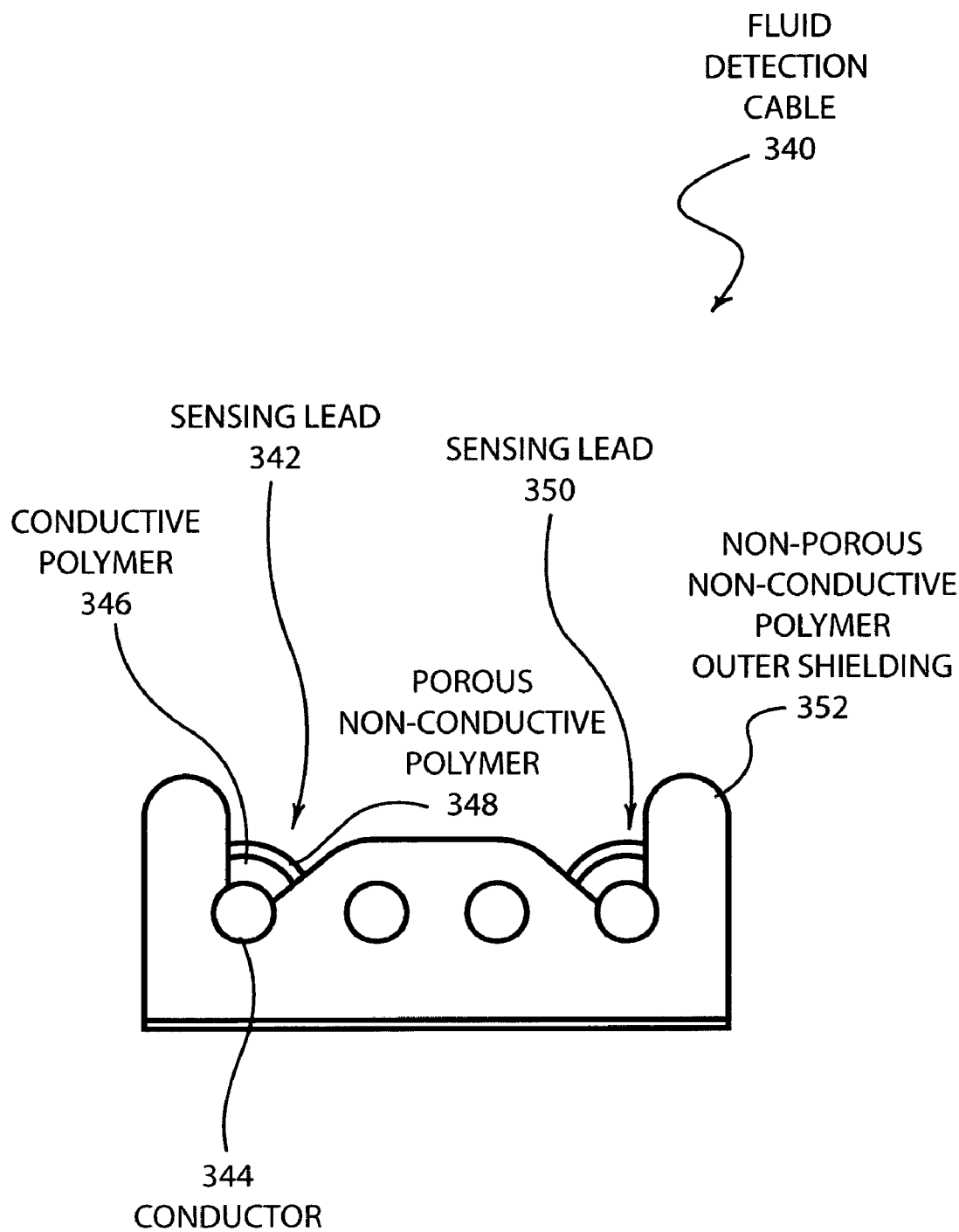
FIG. 3B is a cross-sectional view of another embodiment of a flat fluid detection cable with a porous non-conductive polymer coating.

FIG. 3B illustrates another embodiment of a four-conductor flat fluid detection cable. The fluid detection cable 340 is similar to the fluid detection cable 300 disclosed in FIG. 3A, but has certain structural differences. FIG. 3B discloses monitor leads that are surrounded by a non-porous non-conductive polymer outer shielding 352. FIG. 3B further illustrates that the conductor 344 of first sensing lead 342 may be partially surrounded by a non-porous, non-conductive polymer outer shielding 352. Further, conductor 344 of the first sensing lead 342 may be partially surrounded with a first layer of conductive polymer 346 and a second layer of porous, non-conductive polymer 348, which provides a conductive path for water or other fluids to conductor 344. A second sensing lead 350 may be made substantially the same as the first sensing lead 342.

Figure 3C:
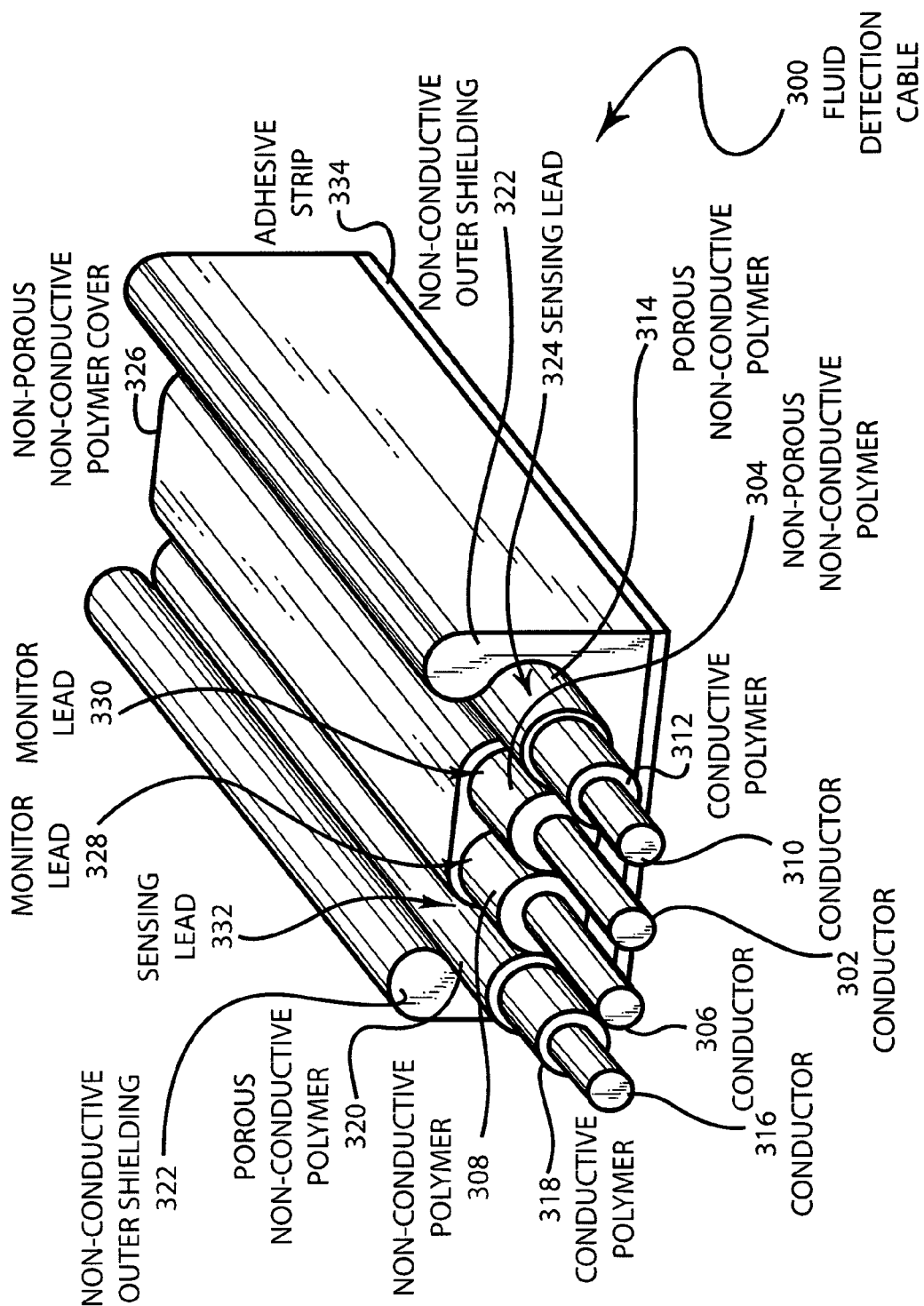
FIG. 3C is an oblique view of a flat fluid detection cable with a porous non-conductive polymer coating.

FIG. 3C illustrates an oblique view of a four-conductor flat fluid detection cable 300, illustrated in FIG. 3A, having a non-conductive polymer outer shielding 322 that forms a trough that is capable of collecting fluid. The fluid detection cable 300 includes a first sensing lead 324. The first sensing lead has a center conductor 310. The center conductor 310 may be made of copper, stainless steel or other conductive materials as disclosed above with respect to FIG. 1. Alternatively, the center conductor may be of resistive material as described above. The center conductor 310 is at least partially surrounded by a conductive polymer 312. The conductive polymer 312 is coated with a porous non-conductive polymer 314. Adjacent and joined to the first sensing lead 324 is a first monitor lead 330. The first monitor lead 330 has a center conductor 302 that may be made of copper or other conductive materials. The center conductor 302 is surrounded by a non-conductive polymer 304. The non-conductive polymer 304 acts as a protective insulator for conductor 302. Adjacent and joined to the first monitor lead 330 is a second monitor lead 328. The second monitor lead 328 has a center conductor 306 that is surrounded by a non-conductive polymer 308. The two monitor leads 330 and 328 are covered by a non-porous non-conductive cover 326. The non-porous non-conductive polymer cover 326 dries easily when wiped thus facilitating quick and easy drying of an installed cable or an uninstalled cable. Adjacent and joined to the second monitor lead 328 is a second sensing lead 332. The second sensing lead has a center conductor 316 that is at least partially surrounded by a conductive polymer 318. The conductive polymer 318 is surrounded by a porous non-conductive polymer 320. Adjacent and joined to the sensing leads 324 and 332 and the monitor leads 330 and 328 is a non-porous non-conductive polymer outer shielding 322. The non-porous non-conductive shielding 322 forms a trough that is capable of collecting fluids. FIG. 3C further illustrates an adhesive strip 334 that is joined to the non-conductive outer shielding 322.

FIG. 4A illustrates an oblique view of another embodiment of a four-conductor fluid detection cable 400. In the embodiment of FIG. 4A, fluid detection cable 400 includes a first sensing lead 402 that has a center conductor 430 that is surrounded by a non-porous conductive polymer. The center conductor 430 may be a low resistance conductor or a resistive conductor as described above with respect to FIG. 1. A second sensing lead 404 may be made substantially the same as first sensing lead 402. Fluid detection cable 400 further includes a first monitor lead 406 that has a conductor 432. Conductor 432 may be a solid conductor or a stranded conductor. Adjacent to first monitor lead 406 is a second monitor lead 408 that may be constructed substantially the same as the first monitor lead. The monitor leads 406, 408 are positioned between the sensing leads 402, 404 so that the cable may be easily wiped to remove fluid. However, other embodiments with the various sensing and monitor leads in different positions with respect to each other are within the scope of the invention.

Monitor leads 406, 408 are surrounded by non-conductive polymer outer shielding 410. Non-conductive polymer outer shielding 410 provides a convenient structure for supporting the sensing leads 402, 404 and monitor leads 406, 408. In the embodiment of FIG. 4A, the non-conductive polymer outer shielding 410 has a substantially planar bottom-side to which an optional adhesive strip 434 may be attached. Non-conductive polymer outer shielding 410 has two sides which are inclined planes 416, 418 as showing in FIG. 4A. Inclined planes 416, 418 permit fluid to easily climb the sides of non-conductive polymer outer shielding 410 and enter troughs 420, 422, 424, 426. Non-conductive polymer covers 412, 414 cover a portion of sensing leads 402, 404 so that a fluid transmission path is provided through which fluid can pass to make electrical contact with a portion of the sensing leads 402, 404. Thus, sensing leads 402, 404 are partially exposed to any fluid that collects in troughs 420, 422, 424, and 426 through small gaps or slots between the non-conductive polymer outer shielding 410 and the non-conductive polymer covers 412, 414. Long continuous slots, i.e. fluid transmission paths, are formed between the non-conductive polymer shielding 410 and the covers 412, 414 at the bottom of troughs 420, 422, 424, 426. The fluid transmission paths allow fluids to electrically contact the sensing leads and, at the same time, the structure of the non-conductive polymer prevents conductive solids from electrically contacting the sensing leads 402, 404. The use of fluid transmission paths that are long continuous slots in the bottom of troughs 420, 422, 424, 426, formed between the non-conductive polymer outer shielding 410 and non-conductive polymer covers 412, 414 allows both the non-conductive polymer outer shielding 410 and the non-conductive polymer covers 412, 414 to be made of a broad range of materials that do not need to be porous and which may be manufactured using a broad ranges of inexpensive manufacturing methods, such as, for example, extrusion, coating, spraying or any method that is desired for use with the selected non-conductive polymer.

In some applications it may be desirable to detect fluids only when the level of the fluid is high enough to climb the inclined planes 416, 418 and enter troughs 420, 422, 424, 426. In other applications, a lower level of fluid may be detected by placing fluid detection cable 400 face-down, i.e. with troughs 420, 422, 424, 426 facing down.

Figure 4B:
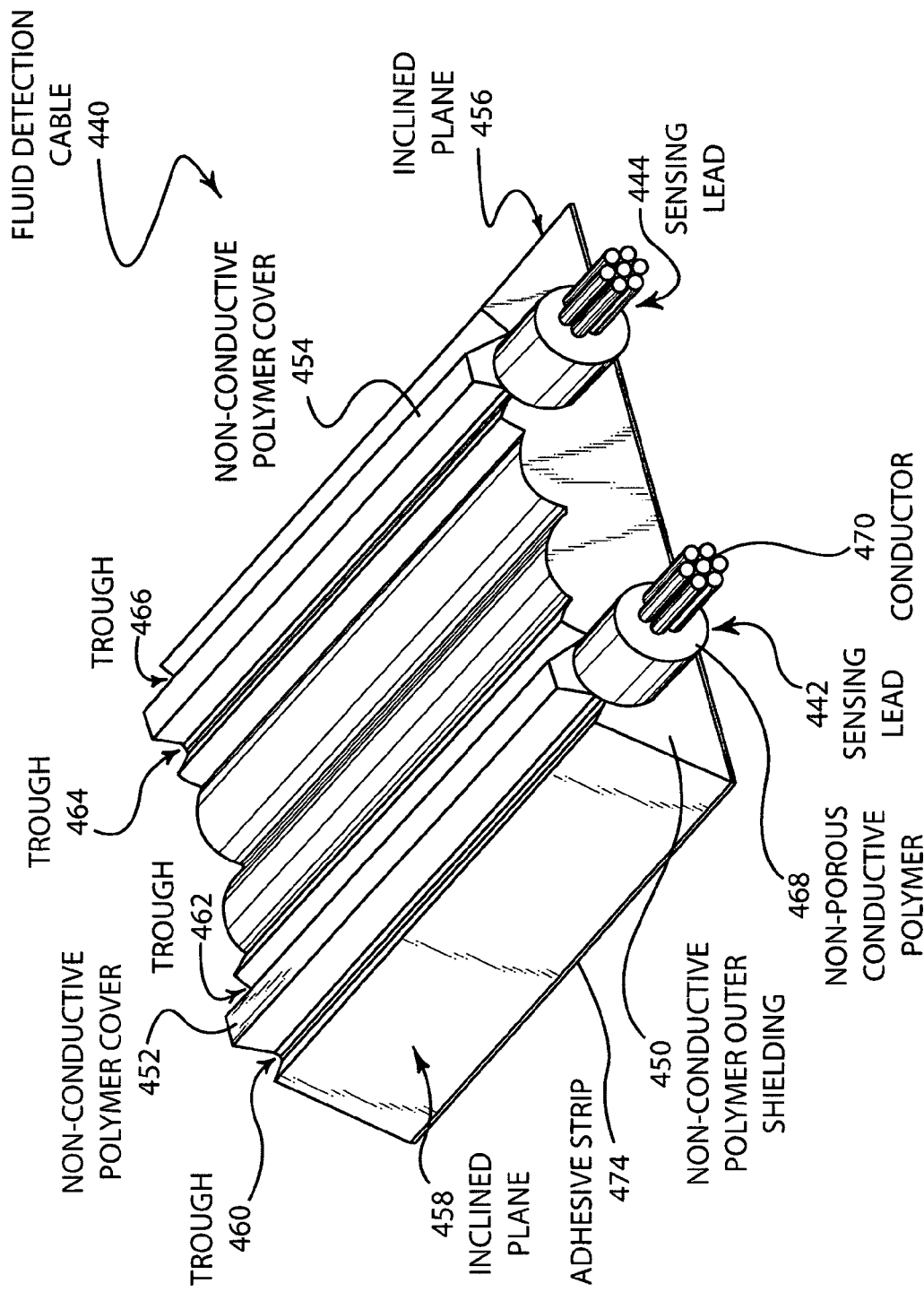
FIG. 4B is an oblique view of another embodiment of a flat fluid detection cable without a porous non-conductive polymer coating.

FIG. 4B illustrates an oblique view of a flat fluid detection cable 440. In the embodiment of FIG. 4B, fluid detection cable 440 includes a first sensing lead 442 that has a center conductor 470 that is surrounded by a non-porous conductive polymer 468. The center conductor 470 may be a low resistance conductor or a resistive conductor as described above with respect to FIG. 1. A second sensing lead 444 may be made substantially the same as first sensing lead 442.

Non-conductive polymer outer shielding 450 provides a convenient structure for supporting the sensing leads 442, 444. In the embodiment of FIG. 4B, the non-conductive polymer outer shielding 450 has a substantially planar bottom-side to which an optional adhesive strip 474 may be attached. Non-conductive polymer outer shielding 450 has two sides which are inclined planes 456, 458 as shown in FIG. 4B. Inclined planes 456, 458 permit fluid to easily climb the sides of non-conductive polymer outer shielding 450 and enter troughs 460, 462, 464, 466. Non-conductive polymer covers 452, 454 cover a portion of sensing leads 442, 444 so that a fluid transmission path is provided through which fluid can pass to make electrical contact with a portion of the sensing leads 442, 444. Thus, sensing leads 442, 444 are partially exposed to any fluid that collects in troughs 460, 462, 464, and 466 through small gaps or slots between the non-conductive polymer outer shielding 450 and the non-conductive polymer covers 452, 454. Long continuous slots, i.e. fluid transmission paths, are formed between the non-conductive polymer shielding 450 and the covers 452, 454 at the bottom of troughs 460, 462, 464, 466. The fluid transmission paths allow fluids to electrically contact the sensing leads and, at the same time, the structure of the non-conductive polymer prevents conductive solids from electrically contacting the sensing leads 442, 444. The use of fluid transmission paths that are long continuous slots in the bottom of troughs 460, 462, 464, 466, formed between the non-conductive polymer outer shielding 450 and non-conductive polymer covers 452, 454 allows both the non-conductive polymer outer shielding 450 and the non-conductive polymer covers 452, 454 to be made of a broad range of materials that do not need to be porous and which may be manufactured using a broad ranges of inexpensive manufacturing methods, such as, for example, extrusion, coating, spraying or any method that is desired for use with the selected non-conductive polymer.

In some applications it may be desirable to detect fluids only when the level of the fluid is high enough to climb the inclined planes 456, 458 and enter troughs 460, 462, 464, 466. In other applications, a lower level of fluid may be detected by placing fluid detection cable 440 face-down, i.e. with troughs 460, 462, 464, 466 facing down.

Figure 4C:
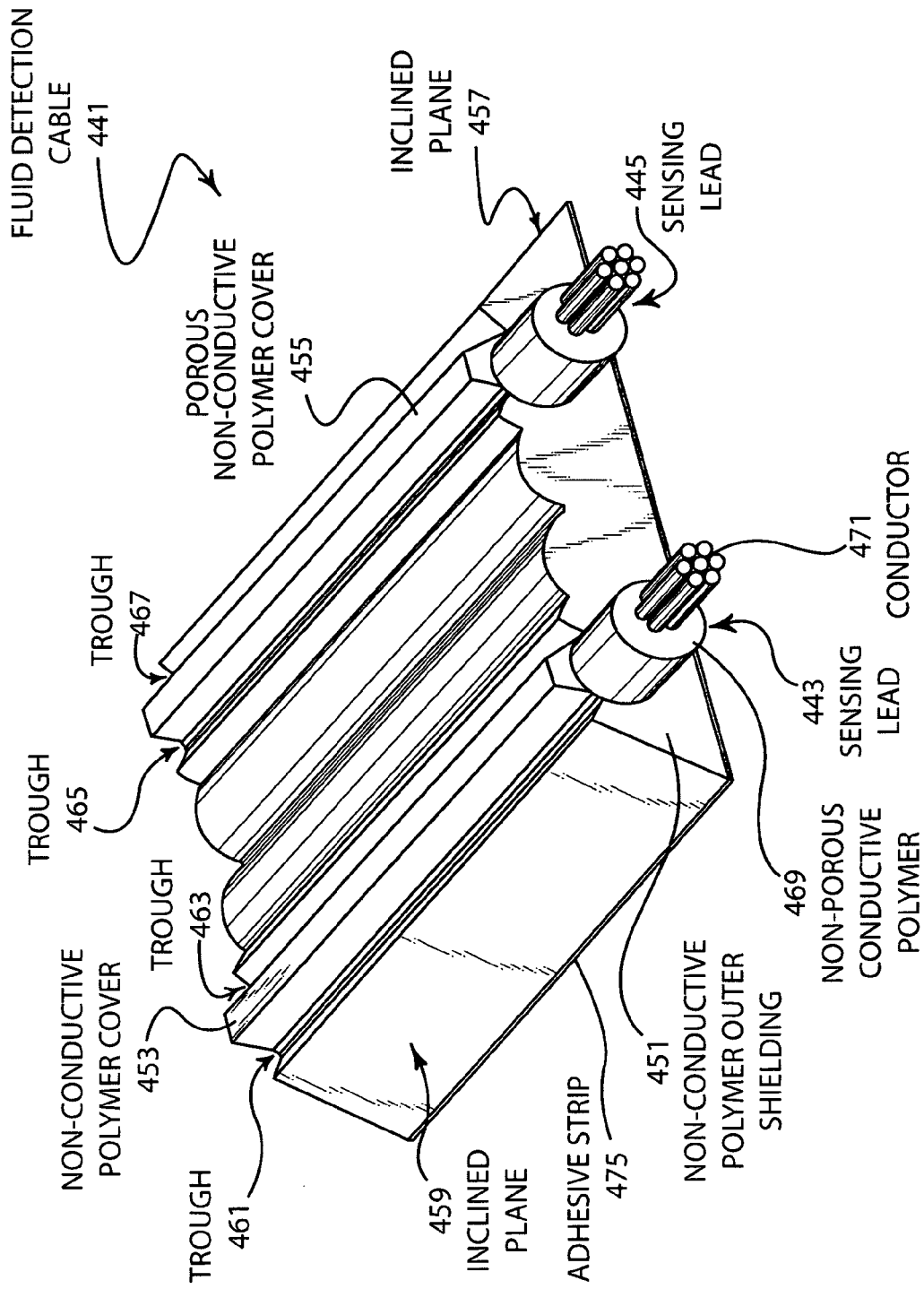
FIG. 4C is an oblique view of another embodiment of a flat fluid detection cable with a porous non-conductive polymer cover on at least one sensing lead.

FIG. 4C illustrates an oblique view of a flat fluid detection cable 441. In the embodiment of FIG. 4C, at least one of the sensing leads such as sensing lead 445 is at least partially covered with a porous non-conductive polymer cover such as porous non-conductive polymer cover 455. Fluid detection cable 441 includes a first sensing lead 443 that has a center conductor 471 that is surrounded by a non-porous conductive polymer 469. The center conductor 471 may be a low resistance conductor or a resistive conductor as described above with respect to FIG. 1. A second sensing lead 445 may be made substantially the same as first sensing lead 443 except that a porous non-conductive polymer cover 445 may be used. The porosity of porous non-conductive polymer cover 445 provides a fluid transmission path that allows electrical contact of a fluid with sensing lead 445.

Non-conductive polymer outer shielding 451 provides a convenient structure for supporting the sensing leads 443, 445. In the embodiment of FIG. 4C, the non-conductive polymer outer shielding 451 has a substantially planar bottom-side to which an optional adhesive strip 475 may be attached. Non-conductive polymer outer shielding 451 has two sides which are inclined planes 457, 459 as shown in FIG. 4C. Inclined planes 457, 459 permit fluid to easily climb the sides of non-conductive polymer outer shielding 451 and enter troughs 461, 463, 465, 467. Non-conductive polymer cover 453 covera a portion of sensing leads 443 so that a fluid transmission path is provided through which fluid can pass to make electrical contact with a portion of the sensing lead 443. Thus, sensing leads 443, 445 are able to be in electrical contact with fluid that collects in troughs 461, 463, 465, and 467 through the fluid transmission path formed between the non-conductive polymer outer shielding 451 and the non-conductive polymer covers 453 or through the fluid transmission path through the porous non-conductive polymer cover 455. The fluid transmission paths allow fluids to electrically contact the sensing leads and, at the same time, the structure of the non-conductive polymer prevents conductive solids from electrically contacting the sensing leads 443, 445.

In some applications it may be desirable to detect fluids only when the level of the fluid is high enough to climb the inclined planes 457, 459 and enter troughs 461, 463, 465, 467. In other applications, a lower level of fluid may be detected by placing fluid detection cable 441 face-down, i.e. with troughs 461, 463, 465, 467 facing down.

Figure 5A:
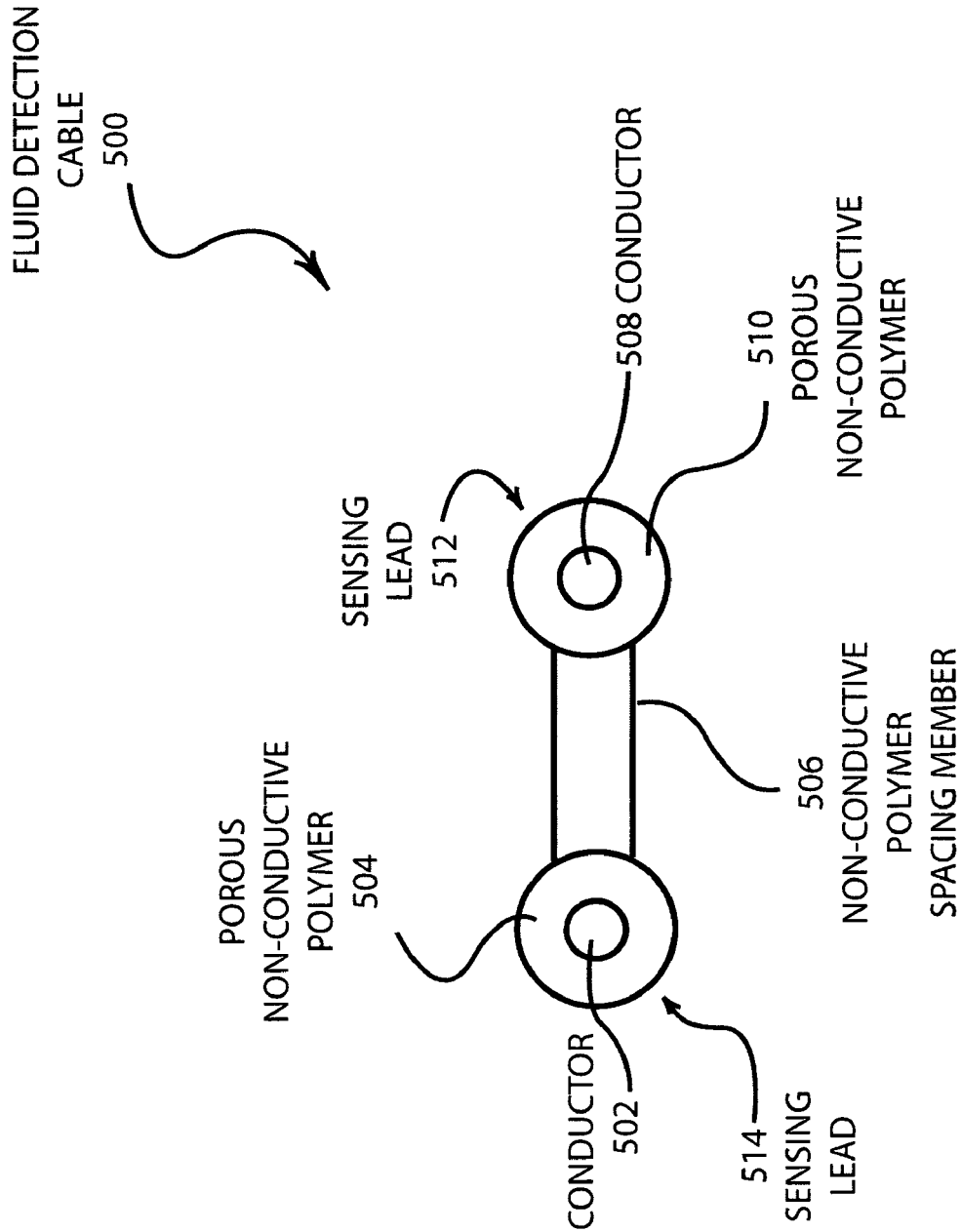
FIG. 5A is a cross-sectional view of another embodiment of a flat fluid detection cable.

FIG. 5A is a cross-sectional view of a fluid detection cable 500. The fluid detection cable 500 includes a first sensing lead 512. The first sensing lead has a center conductor 508 that is surrounded by a porous non-conductive polymer 510. The porous non-conductive polymer 510 electrically insulates the conductor 508 from electrical contact with non-liquid surfaces that are conductive but the porosity allows electrical or ionic contact with fluids. Adjacent and joined to the first sensing lead 512 is non-conductive polymer spacing member 506 of any desired width. The surface of the non-conductive polymer spacing member 506 may be wiped dry to remove fluids. Adjacent and joined to the non-conductive polymer spacing member is a second sensing lead 514. The second sensing lead has a center conductor 502. The conductor 502 is surrounded with a porous non-conductive polymer 504. The fluid detection cable 500 is flat and relatively inexpensive to manufacture. Hence it is especially well suited for residential and other applications requiring low cost.

Figure 5B:
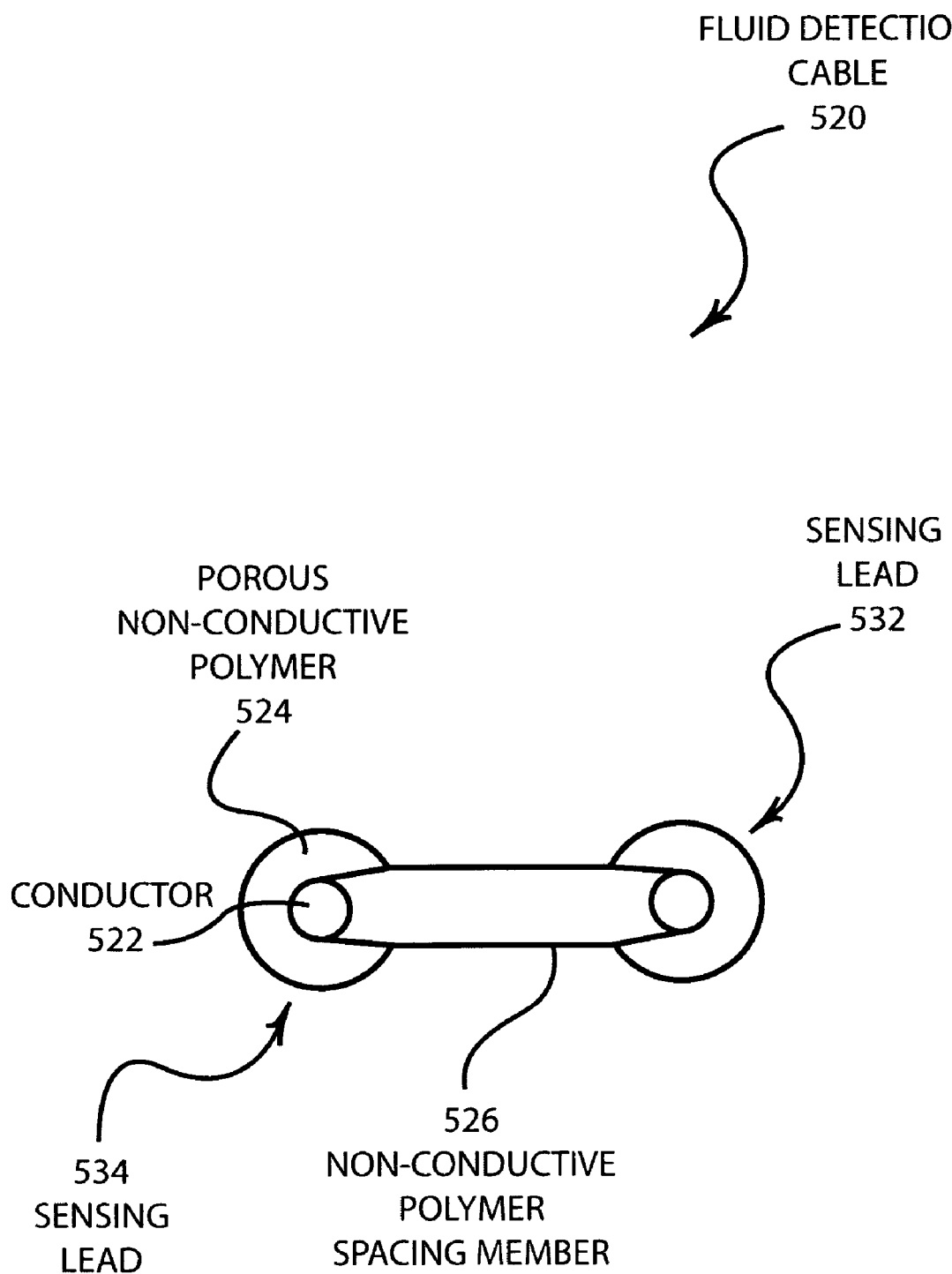
FIG. 5B is a cross-sectional view of another embodiment of a flat fluid detection cable.

FIG. 5B illustrates a fluid detection cable 520. Fluid detection cable 520 is similar to fluid detection cable 500 disclosed in FIG. 5A but has certain structural differences. A first sensing lead 534 has a center conductor 522 that is adjacent and joined to a non-conductive polymer spacing member 526 of any desired width. A porous non-conductive polymer 524 at least partially surrounds the conductor 522. A second sensing lead 532 may be made substantially the same as the first sensing lead 534.

Figure 6A:
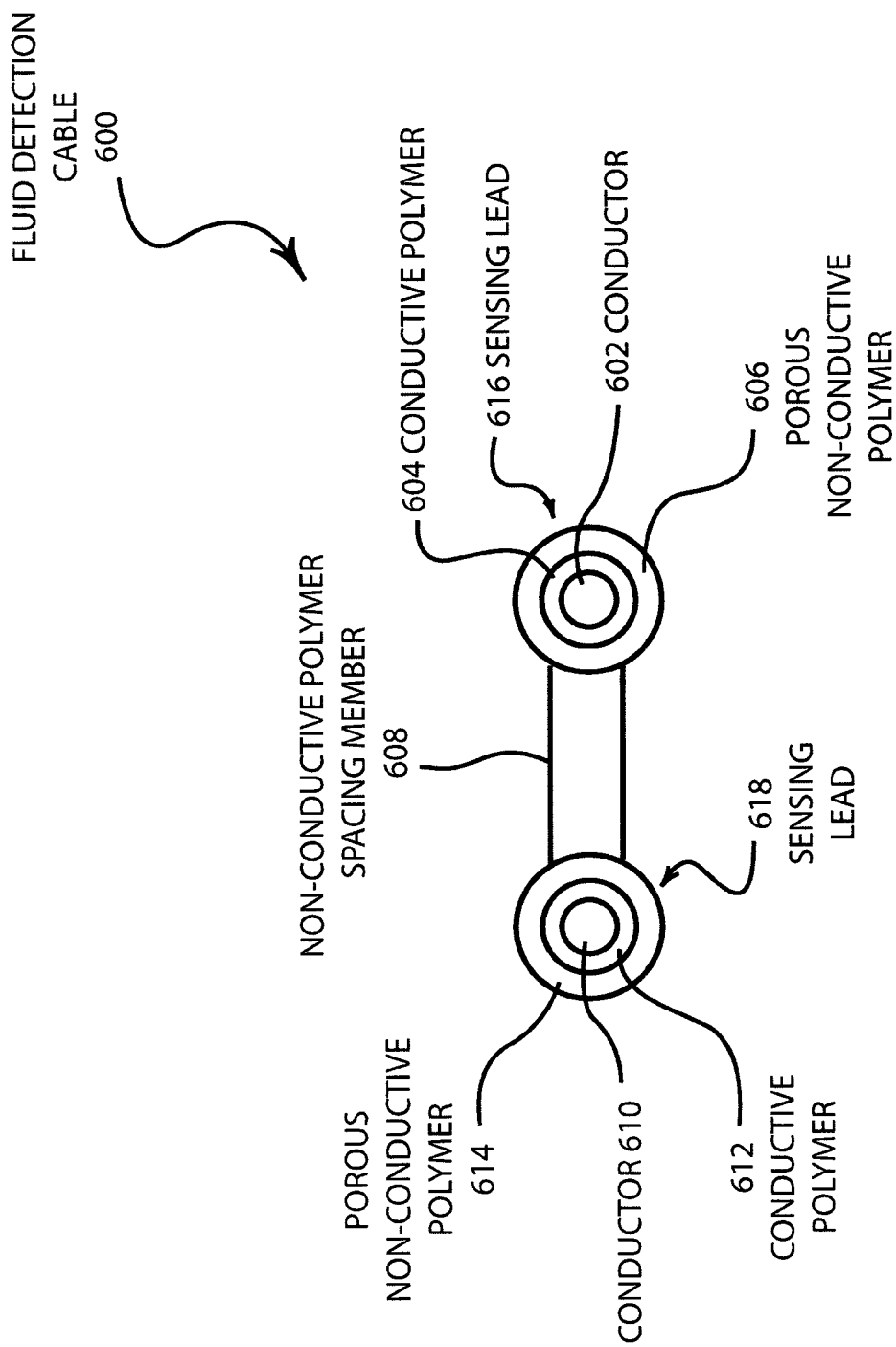
FIG. 6A is a cross-sectional view of another embodiment of a flat fluid detection cable.

FIG. 6A is a cross-sectional view of a fluid detection cable 600. The fluid detection cable 600 includes a first sensing lead 616. The first sensing lead 616 has a center conductor 602 that is surrounded by a conductive polymer 604. The conductive polymer 604 protects the conductor 602 from corrosion when the sensing lead 616 is in the presence of a corrosive fluid. The conductive polymer 604 is encircled with a porous non-conductive polymer 606. The porous non-conductive polymer 606 insulates the conductive polymer 604 from electrical contact with non-liquid surfaces that are conductive but the porosity allows electrical or ionic contact with fluids. Adjacent and joined to the first sensing lead 616 is non-conductive polymer spacing member 608 of any desired width. The surface of the non-conductive polymer spacing member 608 may be wiped dry to remove fluids. Adjacent and joined to the non-conductive polymer spacing member is a second sensing lead 618. The second sensing lead has a center conductor 610. The conductor 610 is surrounded with a conductive polymer 612 that is encircled with a porous non-conductive polymer 614. The fluid detection cable 604 is flat and relatively inexpensive to manufacture. This embodiment also protects the conductors 602 and 610 from corrosive fluids. Hence, it is especially well suited for residential and other applications requiring low cost where corrosive fluids may be present.

Figure 6B:
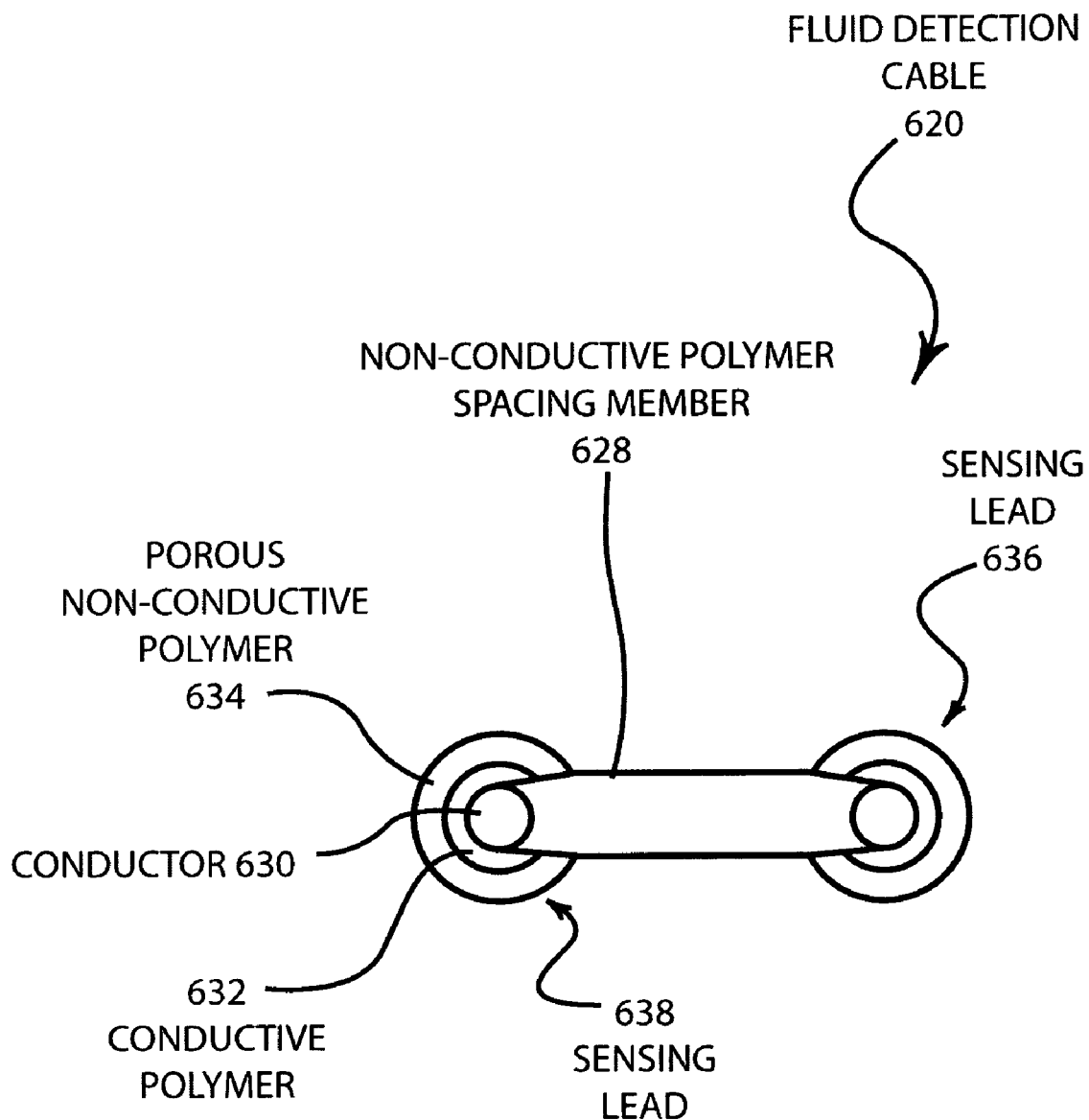
FIG. 6B is a cross-sectional view of another embodiment of a flat fluid detection cable.

FIG. 6B illustrates a fluid detection cable 620. Fluid detection cable 620 is similar to fluid detection cable 600 disclosed in FIG. 6A but has certain structural differences. A first sensing lead 638 has a center conductor 630 that is adjacent and joined to a non-conductive polymer spacing member 628 of any desired width. A first layer conductive polymer 632 at least partially surrounds the conductor 630. A second layer porous non-conductive polymer 634 at least partially surrounds the first layer conductive polymer 632. A second sensing lead 636 may be made substantially the same as the first sensing lead 638.

Figure 7A:
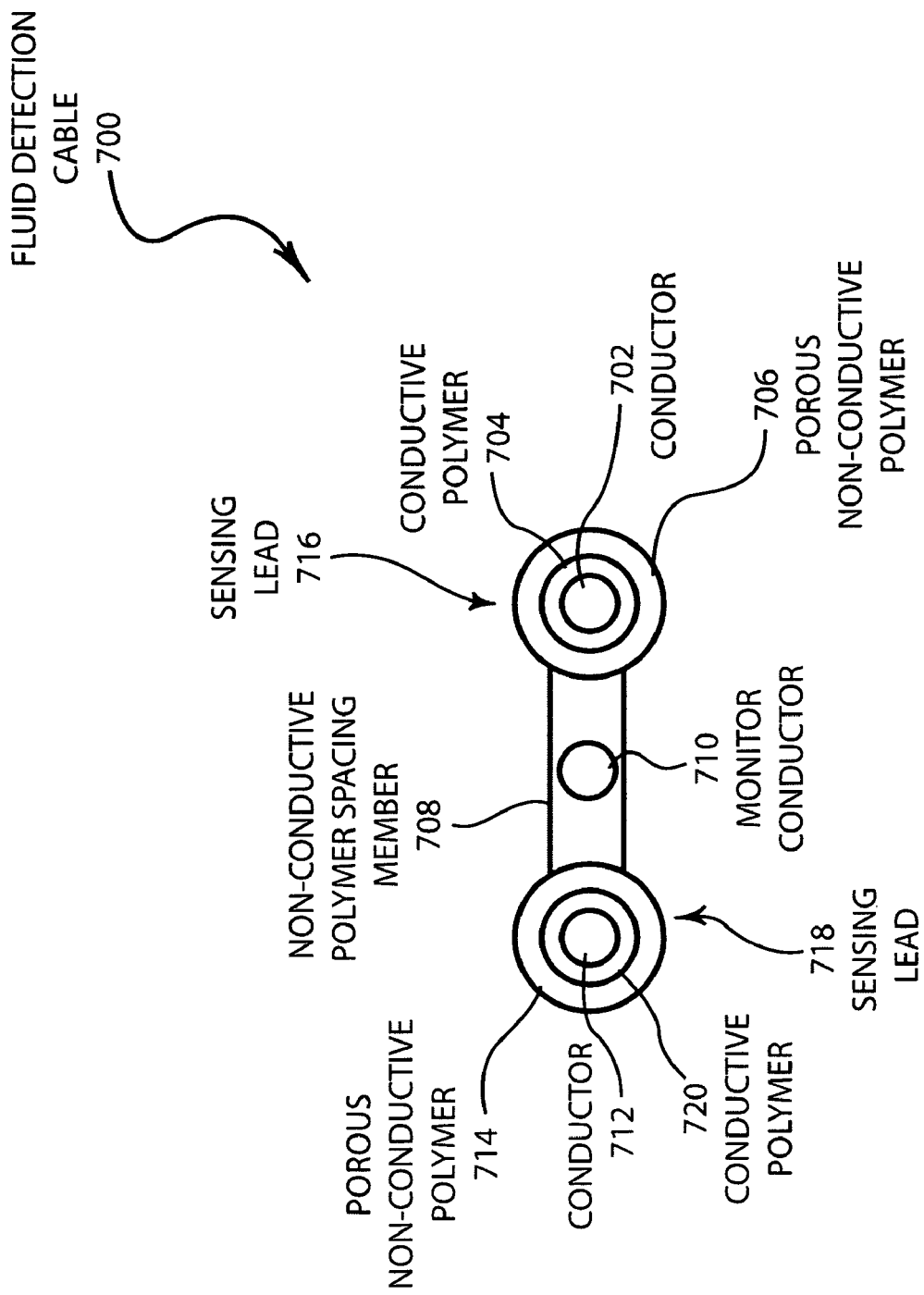
FIG. 7A is a cross-sectional view of another embodiment of a flat fluid detection cable.

FIG. 7A is a cross-sectional view of a fluid detection cable 700. The fluid detection cable 700 includes a first sensing lead 716. The first sensing lead 716 has a center conductor 702 that is surrounded by a conductive polymer 704. The conductive polymer 704 protects the conductor 702 from corrosion when the sensing lead 716 is in the presence of a corrosive fluid. The conductive polymer 704 is encircled with a porous non-conductive polymer 706. The porous non-conductive polymer 706 insulates the conductive polymer 704 from electrical contact with non-liquid surfaces that are conductive and at the same time the porosity allows electrical or ionic contact with fluids. Adjacent and joined to the first sensing lead 716 is non-conductive polymer spacing member 708. The surface of the non-conductive polymer spacing member 708 may be wiped dry to remove fluids. One or more monitor conductors, such as monitor conductor 710 may be embedded within the non-conductive polymer spacing member. The embodiment of FIG. 7A, as well as any of the embodiments that are shown as including monitor wires, can be constructed without any monitor wires, if desired. Adjacent and joined to the non-conductive polymer spacing member is a second sensing lead 718. The second sensing lead has a center conductor 712. The conductor 712 is surrounded with a conductive polymer 720 that is encircled with a porous non-conductive polymer 714. The fluid detection cable 704 is flat and relatively inexpensive to manufacture. This embodiment also protects the conductors 702 and 712 from corrosive fluids. The monitor conductor 710 may be connected to one of the sensing conductors to provide a return path for a current. Alternatively, the monitor conductor 710 may be connected to another electrical signal which if disconnected signals a break in electrical continuity of the cable.

Figure 7B:
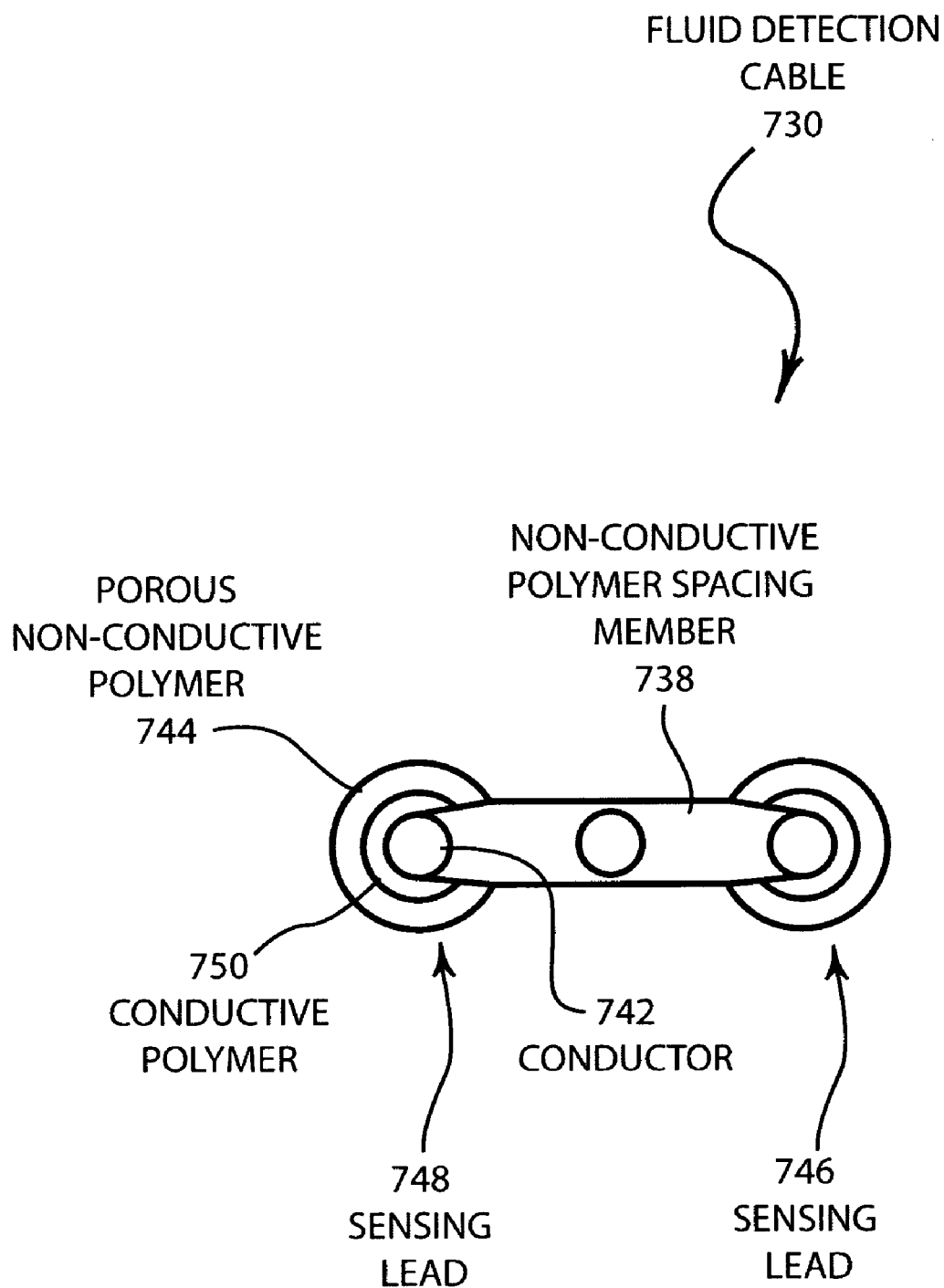
FIG. 7B is a cross-sectional view of another embodiment of a flat fluid detection cable.

FIG. 7B illustrates a fluid detection cable 730. Fluid detection cable 730 is similar to fluid detection cable 700 disclosed in FIG. 7A but has certain structural differences. A first sensing lead 748 has a center conductor 742 that is adjacent and joined to a non-conductive polymer spacing member 738. A first layer conductive polymer 750 at least partially surrounds the conductor 742. A second layer porous non-conductive polymer 744 at least partially surrounds the first layer conductive polymer 750. A second sensing lead 746 may be made substantially the same as the first sensing lead 748.

Figure 8A:
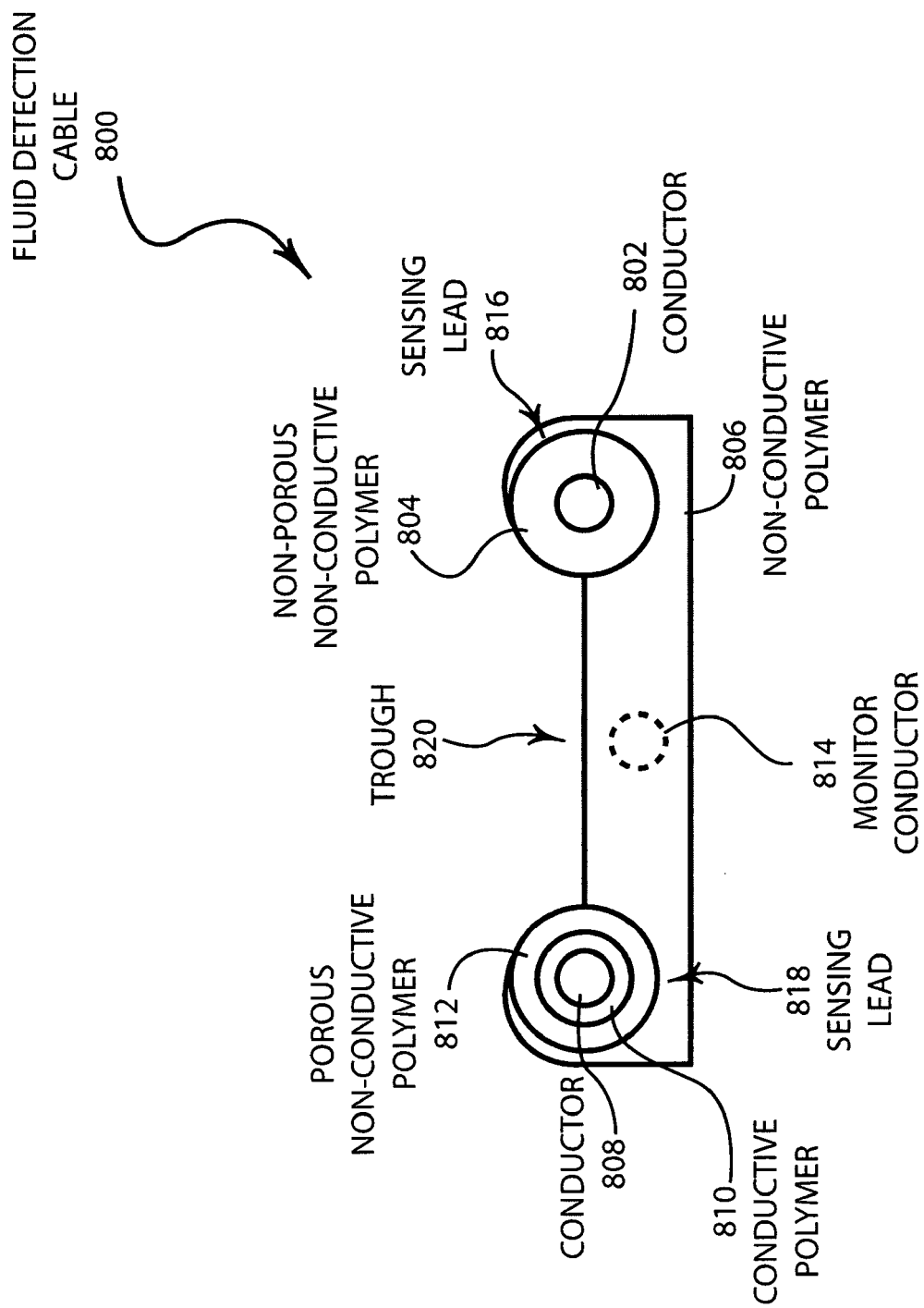
FIG. 8A is a cross-sectional view of another embodiment of a flat fluid detection cable.

FIG. 8A is a cross-sectional view of a fluid detection cable 800. The fluid detection cable 800 includes a first sensing lead 816 that has a center conductor 802. The center conductor 802 is surrounded by a non-porous non-conductive polymer 804. The non-porous non-conductive polymer inhibits electrical contact of fluid and solids with conductor 802 but allows a fluid to be detected by sensing a change in the dielectric at the location of the fluid. The first sensing lead 816 is adjacent and joined to a non-conductive polymer spacing member 806 of any desired width. The non-conductive polymer spacing member 806 may optionally include one or more additional monitor conductors, such as monitor conductor 814. Adjacent and joined to the non-conductive polymer spacing member 806 is a second sensing lead 818. The second sensing lead 818 includes a center conductor 808 that is surrounded by a conductive polymer 810 that protects the conductor 808 from corrosion. The conductive polymer 810 is encircled by a porous non-conductive polymer 812. The non-conductive polymer is made to form a trough 820 that is capable of collecting fluid. The trough allows fluids to be collected between the second sensing lead 818 and the first sensing lead 816. The trough enhances the effectiveness of the fluid detection cable 800 when used with TDR systems as disclosed below with respect to FIG. 9A.

FIG. 8B illustrates a fluid detection cable 830. Fluid detection cable 830 is similar to fluid detection cable 800, disclosed in FIG. 8A but has certain structural differences. A first sensing lead 848 has a center conductor 838 that is adjacent and joined to a non-conductive polymer spacing member 836 of any desired width. A first layer conductive polymer 840 at least partially surrounds the conductor 838. A second layer porous non-conductive polymer 842 at least partially surrounds the first layer conductive polymer 840. A second sensing lead 852 has a conductor 832 that is surrounded by a non-porous non-conductive polymer spacing member 836. The non-conductive polymer spacing member 836 forms a trough 850 that is capable of collecting fluid. The non-porous non-conductive polymer inhibits electrical contact of fluid and solids with conductor 832 but allows a fluid to be detected by sensing a change in the dielectric at the location of the fluid.

Figure 8C:
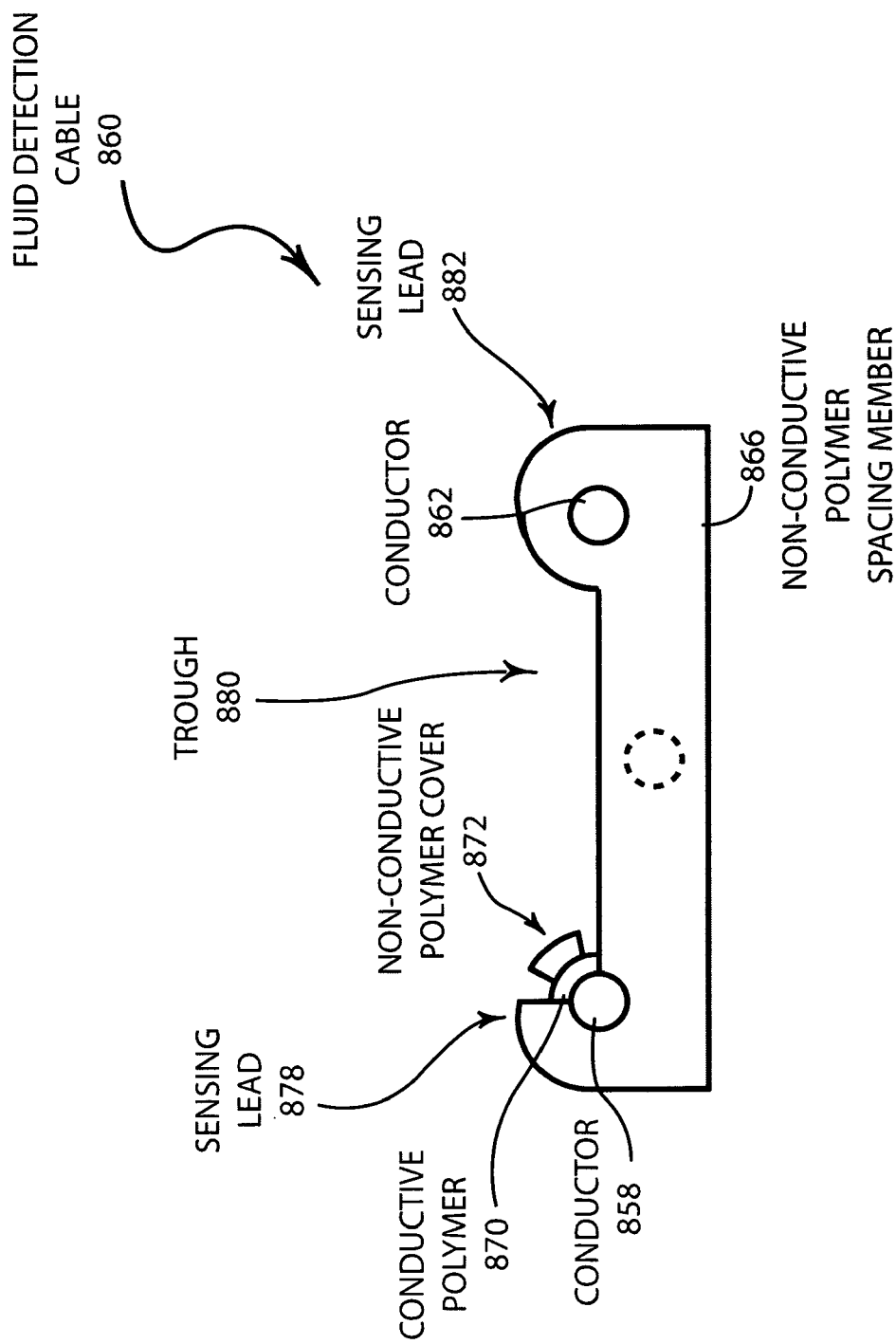
FIG. 8C is a cross-sectional view of another embodiment of a flat fluid detection cable.

FIG. 8C illustrates a fluid detection cable 860. Fluid detection cable 860 is similar to fluid detection cable 830, disclosed in FIG. 8B but has certain structural differences. A first sensing lead 878 has a center conductor 858 that is adjacent and joined to a non-conductive polymer spacing member 866 of any desired width. A first layer conductive polymer 870 at least partially surrounds the conductor 858. A second layer non-conductive polymer cover 872 at least partially covers the first layer conductive polymer 870. A least one structural fluid transmission path for fluid to electrically contact conductive polymer 870 is provided between non-conductive polymer cover 872 and non-porous non-conductive polymer spacing member 866. A second sensing lead 882 has a conductor 862 that is surrounded by a non-porous non-conductive polymer spacing member 866. The non-conductive polymer spacing member 866 forms a trough 880 that is capable of collecting fluid. The non-porous non-conductive polymer 866 inhibits electrical contact of fluid and solids with conductor 862 but allows a fluid to be detected by sensing a change in the dielectric at the location of the fluid.

Figure 9A:
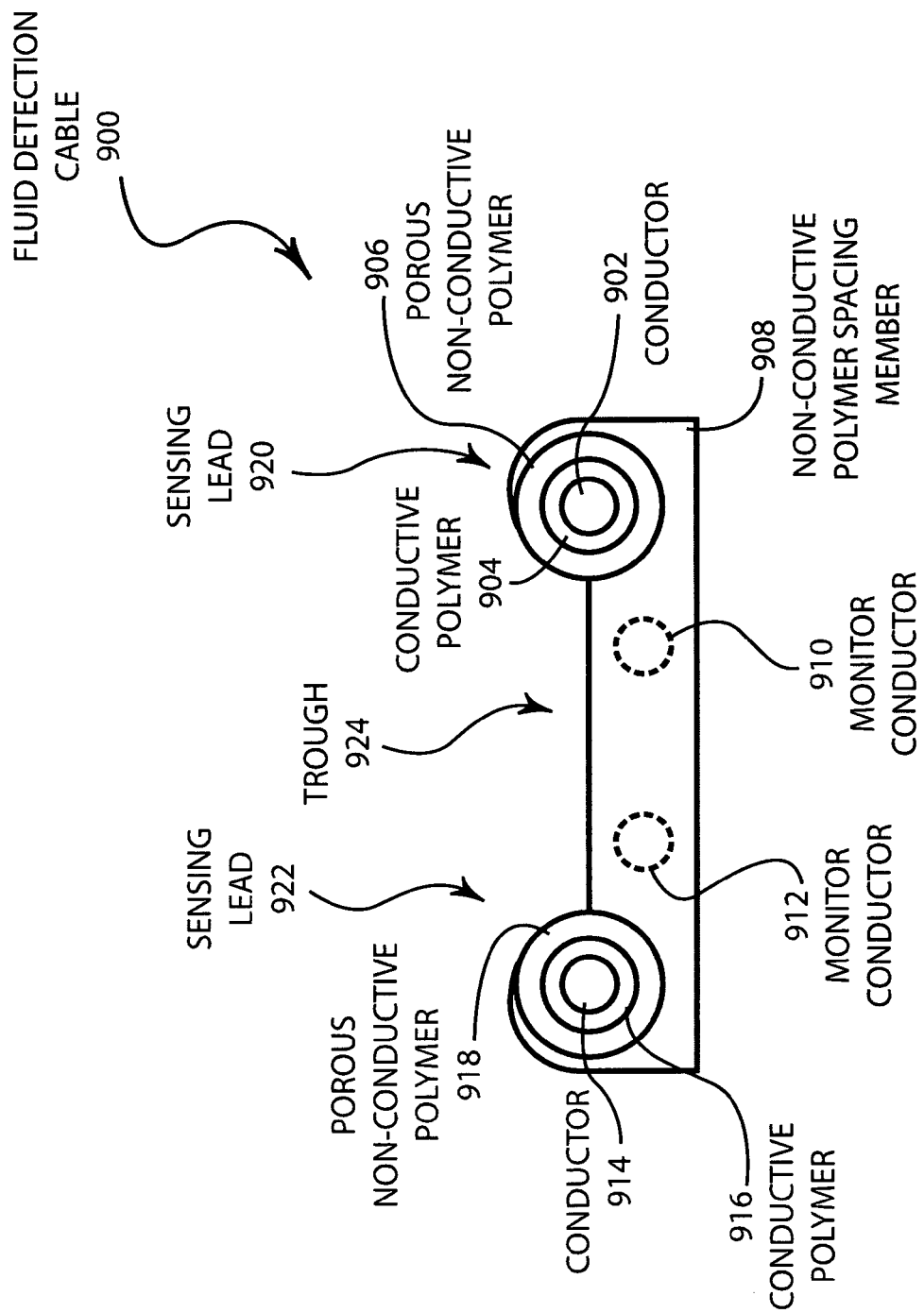
FIG. 9A is a cross-sectional view of another embodiment of a flat fluid detection cable.

FIG. 9A is a cross-sectional view of a fluid detection cable 900. The fluid detection cable 900 includes a first sensing lead 920 that has a center conductor 902 that is surrounded by a conductive polymer 904. The conductive polymer 904 in encircled in a porous non-conductive polymer 906. The sensing lead 920 is adjacent and joined to a non-conductive polymer spacing member 908. The non-conductive polymer spacing member 908 may optionally include one or more monitor conductors 910 and 912. Adjacent and joined to the non-conductive polymer spacing member 908 is a second sensing lead 922. The second sensing lead 902 includes a center conductor 914 that is surrounded by a conductive polymer 916 that protects the conductor 914 from corrosion. The conductive polymer 916 is surrounded by a porous non-conductive polymer 918. The first sensing lead 920 and the second sensing lead 922 are joined to the non-conductive polymer spacing member 908 and disposed to form a trough 924 that is capable of collecting fluid.

In a Time Domain Reflectometry fluid detection system, the presence of water or other fluids causes a change in the dielectric constant at that location of the cable. This change in dielectric constant is measured by sending a signal into a first sensing lead, which may be any of the sensing leads 922 and 920, of the cable and measuring the reflected signal over a period of time. A second sensing lead acts as a ground reference. The reflected signal measurement at each point in time corresponds to a location along the length of the cable. If water or other fluids are in contact with the sensing leads of the cable, a reflection corresponding to the location of the liquid will occur. No reflection will occur from locations where no fluid is present. In a TDR system, the fluid need not be conductive, but the reflection corresponding to a location in contact with a conductive fluid will have a different amplitude and otherwise differ from a reflection resulting from a non-conductive fluid. The sensitivity of the TDR system to the change in dielectric constant is enhanced by an electrically conductive path from the first sense lead 922 to the second sense lead 920. Further, the formation of a trough 924, or fluid collecting channel, by the non-porous non-conductive polymer spacing member 908, enhances the sensitivity of the TDR fluid detection system by increasing the amount of fluid and associated dielectric constant in electrical contact with the two sensing leads 922 and 920. In other words, the fluid acts as a dielectric material that causes a reflected wave in the detection cable. The delay of the reflected pulse is indicative of the location of the fluid. The amplitude of the reflected wave is indicative of the type of fluid. For example, water contains more ions than petrochemicals. Water will cause a larger reflected pulse, as explained below. Presence of an electrical short circuit between the sense leads of a fluid detection cable, such as by unintentional contact with a metal object, such as the side of a cooler or dishwasher, will cause a false detection in prior art liquid detection cables. Use of a porous non-conductive polymer 906 and 918 surrounding the sense leads 922 and 920 of the fluid detection cable prevents false detections caused by short circuiting of the sense leads as a result of an unintentional contact with a non-liquid conductive surface.

In another application, various embodiments of the fluid detection cable may be used to detect the presence of a fluid in a dissimilar fluid. The presence of conductive fluids that are in contact with sensing leads of various embodiments of the fluid detection cable can be distinguished from the presence of non-conductive fluids by measuring the amplitude of the reflections. Reflections from locations in contact with conductive fluids will have a reflection with greater amplitude than reflections from locations in contact with non-conductive fluids. For example, in a fuel tank, a thin layer of water may accumulate at the bottom of the tank. The fluid detection cable 900 may be disposed at the bottom of the tank and because of the flatness of the cable and the trough 924 formed by the non-conductive polymer spacing member 908 and the sensing leads 920 and 922, a quantity of water will be collected in the trough 924. The water can be sensed, using a conductive and resistive measurement, or using a TDR system to measure a different dielectric constant at the location of the cable that is in contact with water. Other embodiments of the fluid detection cable as disclosed above may be used with a TDR system.

Figure 9B:
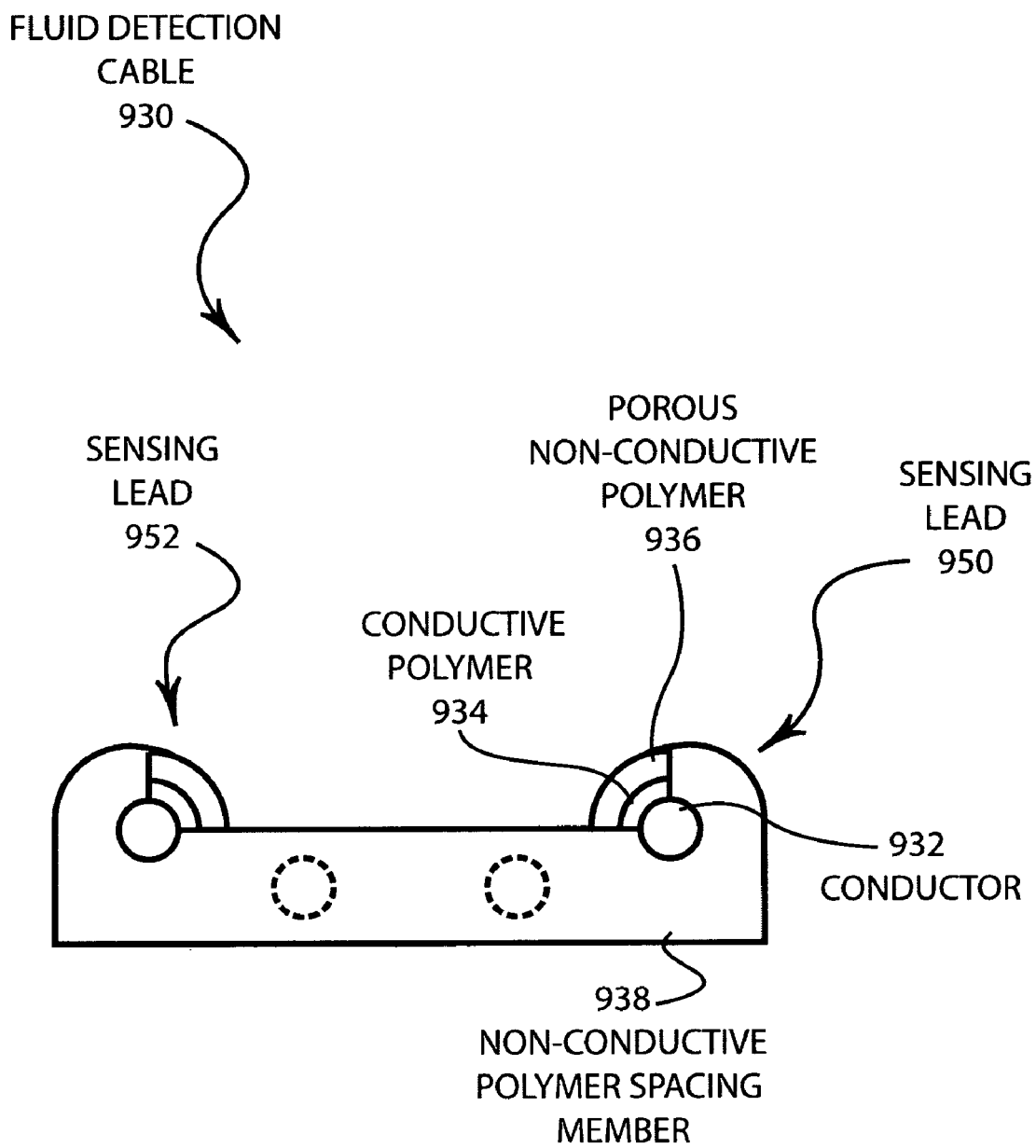
FIG. 9B is a cross-sectional view of another embodiment of a flat fluid detection cable.

FIG. 9B illustrates a fluid detection cable 930. Fluid detection cable 930 is similar to fluid detection cable 900 disclosed in FIG. 9A but has certain structural differences. A first sensing lead 950 has a center conductor 932 that is adjacent and joined to a non-conductive polymer spacing member 938. A first layer conductive polymer 934 at least partially surrounds the conductor 932. A second layer porous non-conductive polymer 936 at least partially surrounds the first layer conductive polymer 934. A second sensing lead 952 may be made substantially the same as the first sensing lead 950.

Figure 10A:
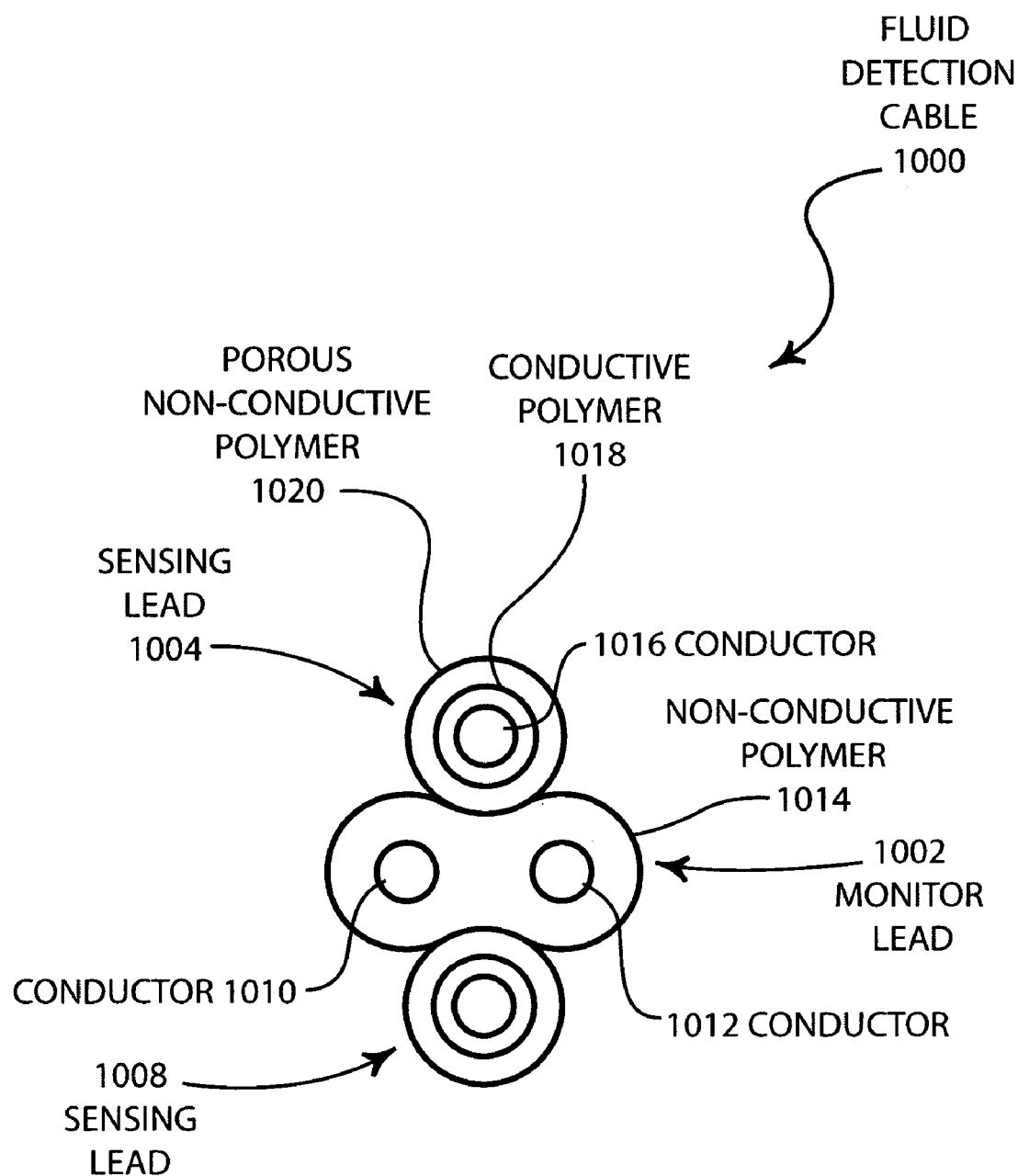
FIG. 10A is a cross-sectional view of another embodiment of a fluid detection cable.

FIG. 10A is a cross-sectional view of a non-planar embodiment of a fluid detection cable 1000. The fluid detection cable includes a first sensing lead 1004. The first sensing lead 1004 has a center conductor 1016 surrounded by a conductive polymer 1018. The conductive polymer 1018 is surrounded by a porous non-conductive polymer 1020. The fluid detection cable further includes a two-conductor monitor lead 1002. The two-conductor monitor lead 1002 has a first conductor 1012 and a second conductor 1010. The first conductor 1012 and the second conductor 1010 are electrically insulated and surrounded by a non-conductive polymer 1014. Disposed at a midpoint of the two-conductor monitor lead 1002 and joined to the two-conductor monitor lead 1002 is the first sensing lead 1004. A second sensing lead 1008 that is constructed substantially the same as the first sensing lead 1004 is joined to the two-conductor monitor lead on the side opposite from the first sensing lead 1004. The porous non-conductive polymer on the sensing leads protects the sensing leads from electrical contact with non-liquid surfaces that are conductive. For example, the fluid detection cable could be used inside a metallic conduit.

Figure 10B:
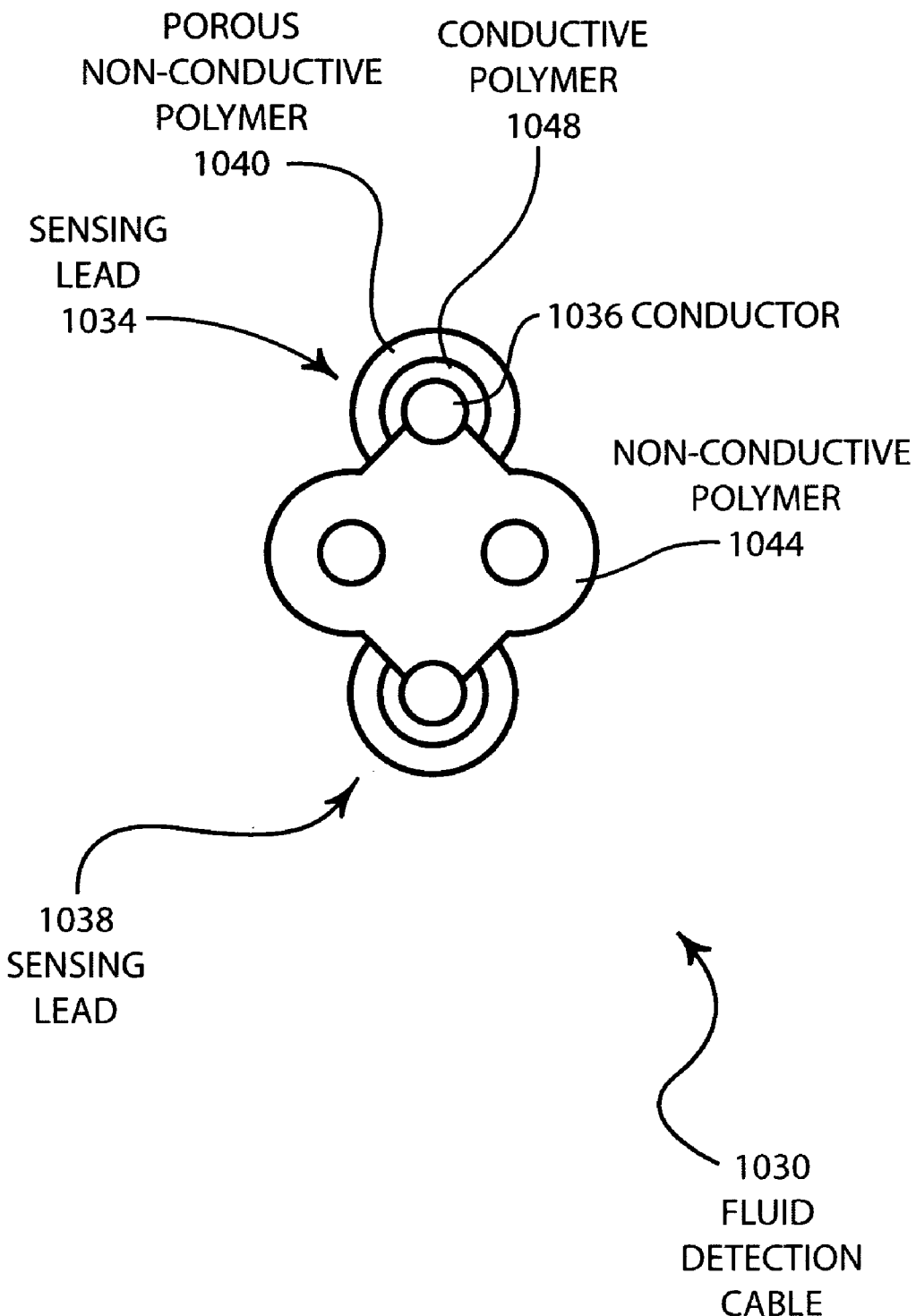
FIG. 10B is a cross-sectional view of another embodiment of a fluid detection cable.

FIG. 10B illustrates a fluid detection cable 1030. Fluid detection cable 1030 is similar to fluid detection cable 1000 disclosed in FIG. 10A but has certain structural differences. A first sensing lead 1034 has a center conductor 1036. A first layer conductive polymer 1048 at least partially surrounds the conductor 1036. A second layer porous non-conductive polymer 1040 at least partially surrounds the first layer conductive polymer 1048. The first sensing lead 1034 is adjacent and joined to a non-conductive polymer spacing member 1044. A second sensing lead 1038 may be made substantially the same as the first sensing lead 1034.

Figure 11A:
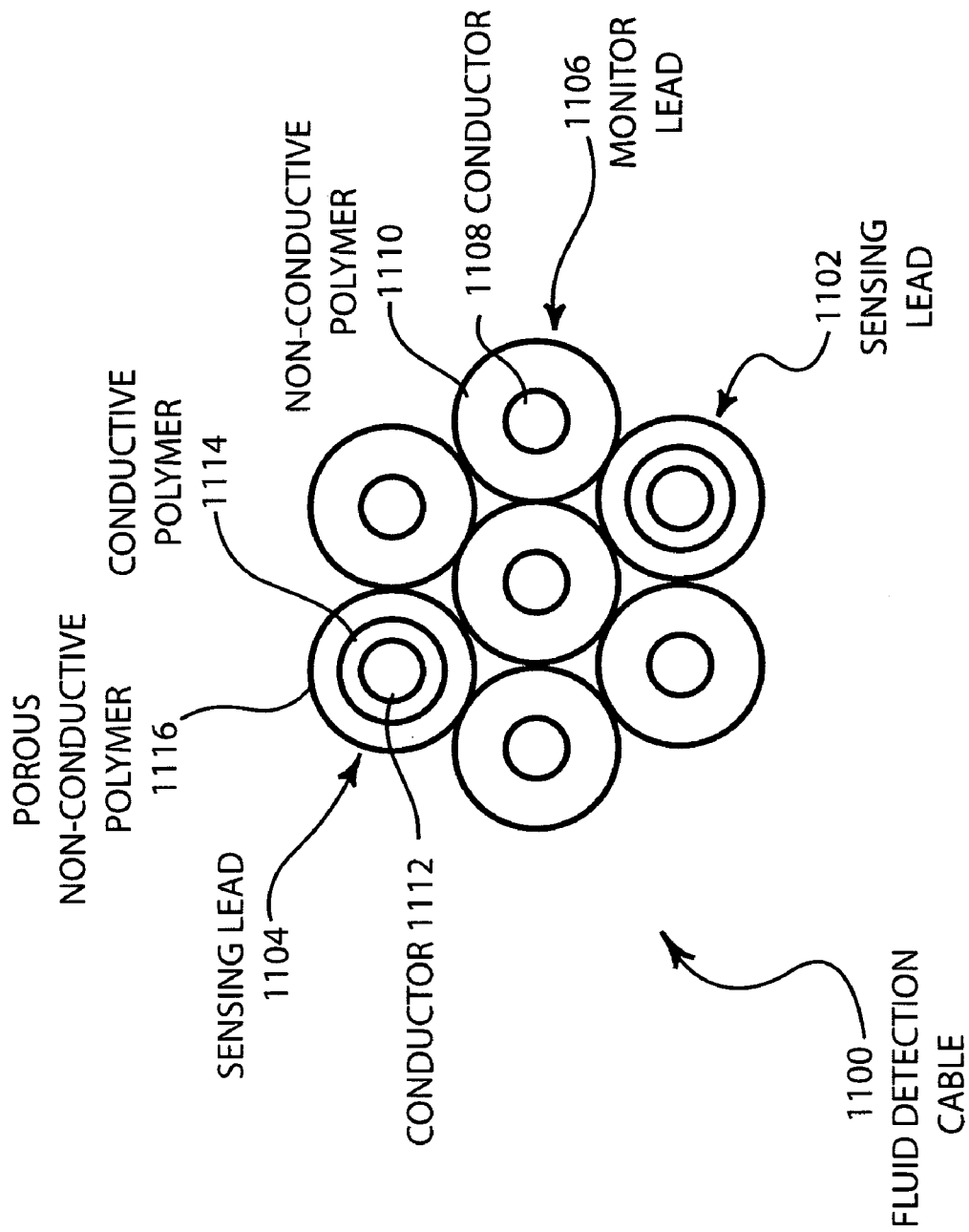
FIG. 11A is a cross-sectional view of a multi-conductor embodiment of a fluid detection cable.

FIG. 11A illustrates another embodiment of a fluid detection cable 1100. Fluid detection cable 1100 includes a first sensing lead 1104. The first sensing lead has a center conductor 1112 that is surrounded by a conductive polymer 1114. The conductive polymer 1114 is surrounded by a porous non-conductive polymer 1116. The fluid detection cable further includes a second sensing lead 1102 constructed substantially the same as the first sensing lead. The fluid detection cable 1100 includes a plurality of monitor leads. A first monitor lead 1106 has a center conductor 1108 surrounded by a non-conductive polymer 1110. Other monitor leads are constructed substantially the same as the first monitor lead. The first sensing lead 1104 and the second sensing lead 1102 are joined to the monitor leads.

In larger systems, low resistance conductors may comprise a leader cable to electrically connect the fluid detection cable to the control system. The leader cable is not used to detect the presence of fluids and therefore need only have low resistance conductive members (e.g. conductors). In such systems it may be desirable to have multiple sections of fluid detection cable. Such a system may use multiple leader cables connected to multiple fluid detection cables. The system may first determine the section or sections of cable that are in contact with fluid. Then the distance from the controller to the fluid may be determined as disclosed above. Multiple sections of fluid detection cable 1100 may be connected so that some of the monitor leads of a first section of cable act as leader cables for a second section of cable. The monitor leads of the second section of cable act as leader cables for subsequent sections of cable. Thus, instead of installing multiple fluid detection cables with multiple leader cables, a single fluid detection cable 1100 may be installed in sections, with the multiple monitor leads acting as leader cables to subsequent sections. The fluid detection cable 1100 with multiple monitor leads may be constructed in a non-planar embodiment as shown in FIG. 1100, or the sensing leads and monitor leads may be joined to form a flat cable. In either case the outer coating of porous polymer surrounding the sensing leads protects the cable from false alarms through an electrical short circuit of the sensing leads when in contact with a conductive non-liquid surface.

FIG. 11B illustrates a fluid detection cable 1120. Fluid detection cable 1120 is similar to fluid detection cable 1100 disclosed in FIG. 11A but has certain structural differences. A first sensing lead 1124 has a center conductor 1132 that is adjacent and joined to a non-conductive polymer 1130. A first layer conductive polymer 1134 at least partially surrounds the conductor 1132. A second layer porous non-conductive polymer 1136 at least partially surrounds the first layer conductive polymer 1134. A second sensing lead 1122 may be made substantially the same as the first sensing lead 1032.

Figure 12:
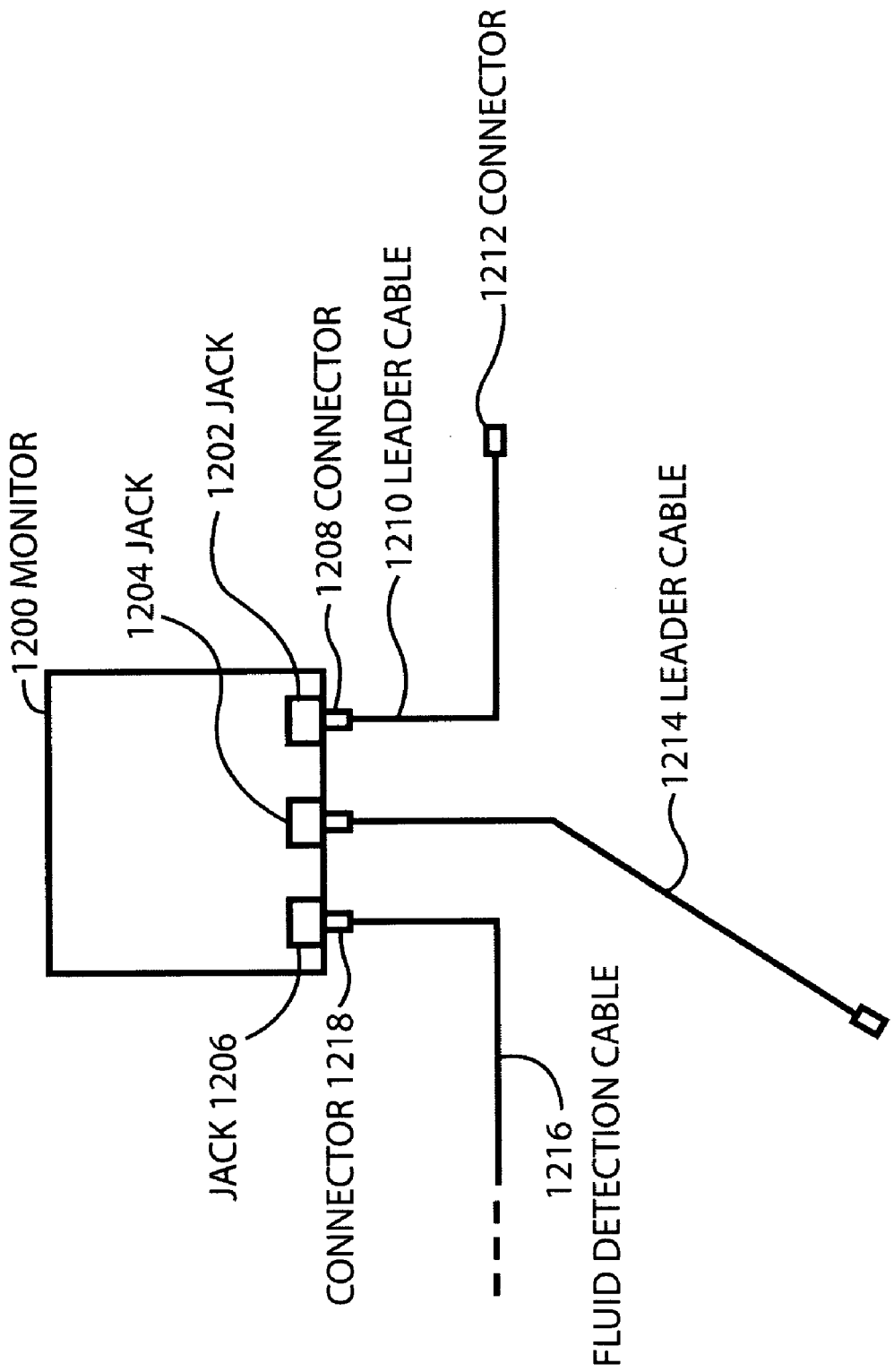
FIG. 12 illustrates the manner that a fluid detection cable may be connected to a transmitter through the use of low-cost plugs and receptacles.

FIG. 12 illustrates the use a fluid detection cable 1216 in multiple cable system. A detector 1200 may have a plurality of jacks including a first jack 1206. A fluid detection cable 1216 has a connector 1218 that is plugged into jack 1206 of the detector. The detector may have a second jack 1204. Another cable that is a first leader cable 1214 may be plugged into a second jack 1204. The detector may have a third jack 1202. A second leader cable 1210 that has a first connector 1208 may be plugged into the third jack 1202 and a second connector 1212 that may be used to connect to another fluid detection cable or a leader cable. The jacks provide a simple and easy manner of connecting fluid detection cables and leader cables to the detector 1200.

Figure 13:
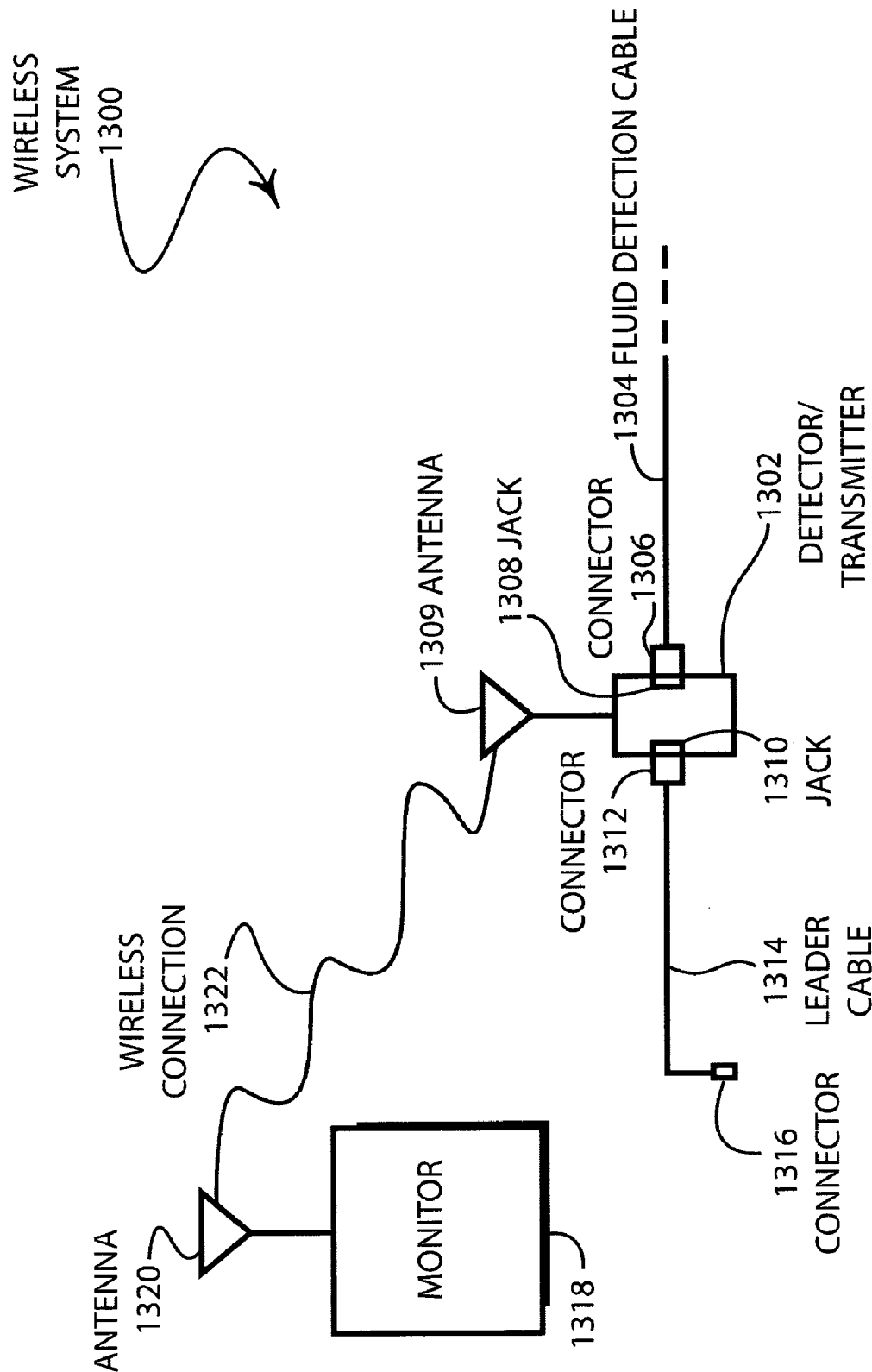
FIG. 13 illustrates the use of a fluid detection cable with plugs, receptacles and control system with transmitter for connecting to a remote monitor.

FIG. 13 illustrates the use of a fluid detection cable in a wireless system 1300. The wireless system 1300 has a detector/transmitter 1302 connected to an antenna 1309 and one or more jacks including a first jack 1308 and a second jack 1310. A fluid detection cable 1304 that has a connector 1306 may be plugged into the first jack 1308 of the detector/transmitter 1302. The wireless system 1300 may have a second cable which may be a leader cable 1314 that has a first connector 1312. The first connector 1312 may be plugged into the second jack 1310 of the detector/transmitter 1302. The leader cable 1314 has a second connector 1316 that may be used to connect to another fluid detection cable or a leader cable. The wireless system further includes a monitor 1318 that has an antenna 1320 and is connected to the detector/transmitter via a wireless connection 1322. A wireless system may be well suited for applications where installation of a leader cable is not desired such as, for example, in finished buildings where no provision has been made to install additional cables.

Figure 14:
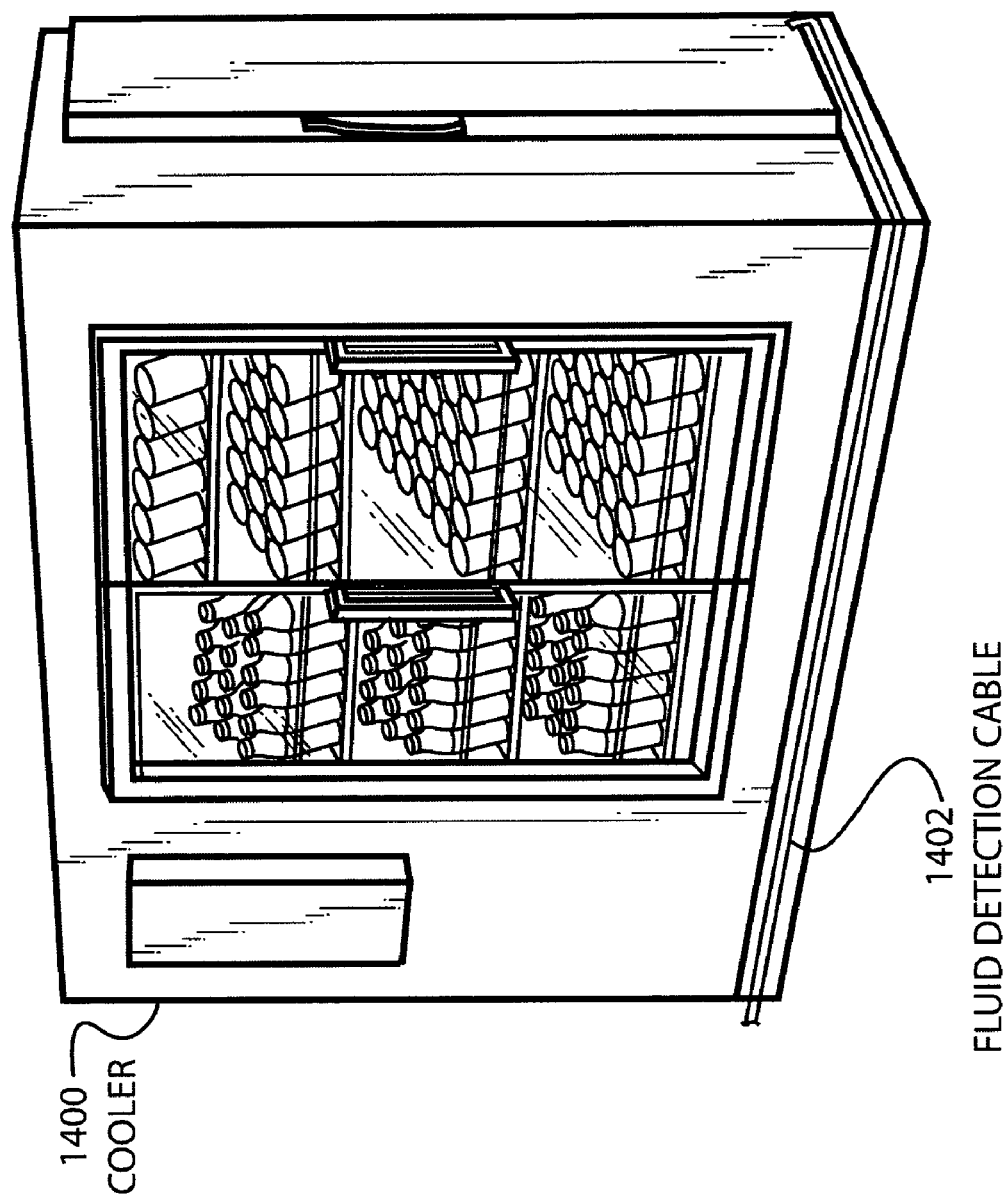
FIG. 14 illustrates the use of a fluid detection cable in a particular application.

FIG. 14 illustrates the use of a fluid detection cable 1402 in a commercial or industrial application with a cooler 1400. It may be desirable to attach the fluid detection cable to the cooler 1400 at a height so that the fluid detection cable is not in contact with a floor which may get wet during mopping. Thus, a level of water high enough to potentially damage the cooler or other equipment will be detected, but a thin film of water from cleaning, mopping, or condensation will not cause a false alarm.

Figure 15:
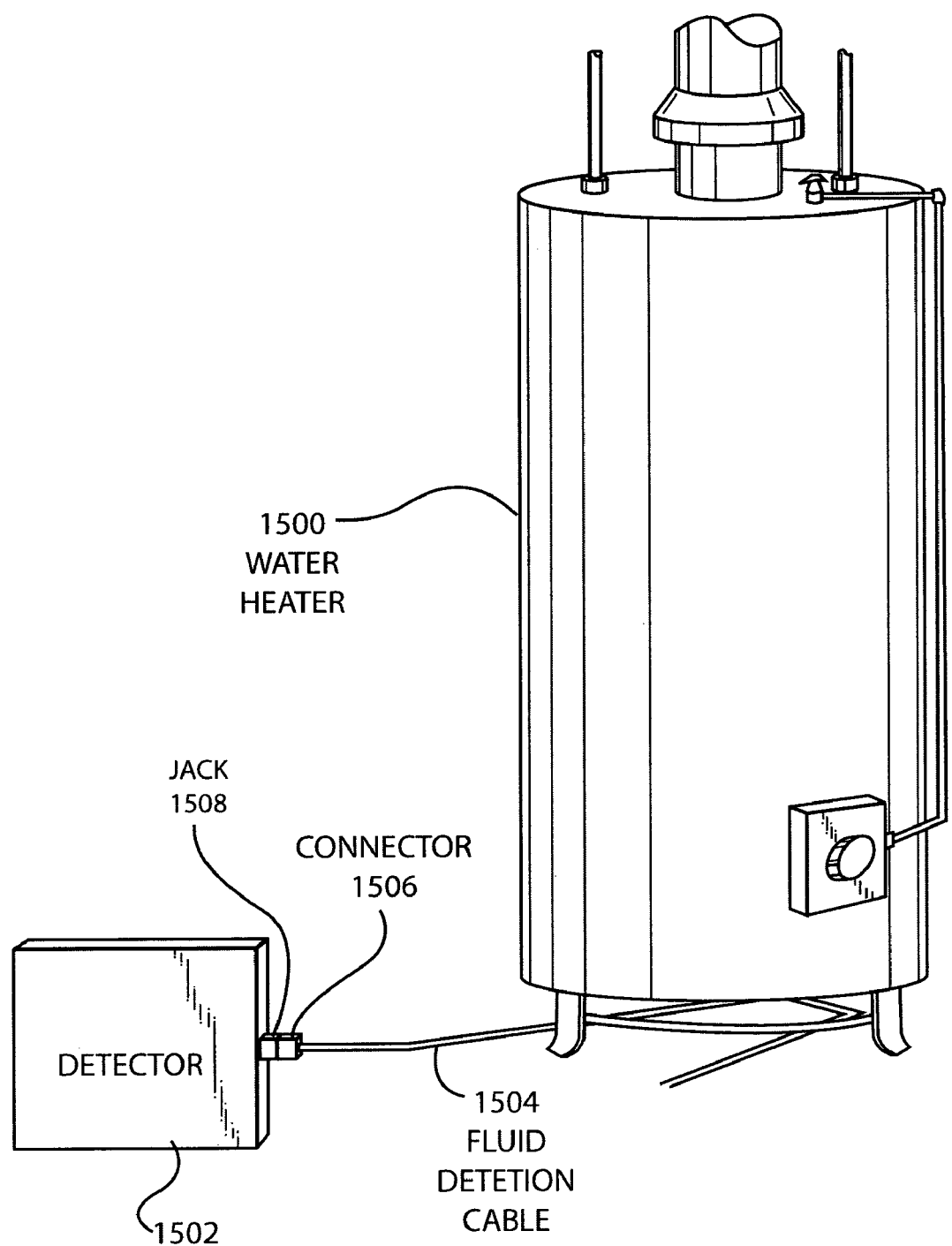
FIG. 15 illustrates the use of a fluid detection cable in another application.

FIG. 15 illustrates using a fluid detection cable 1504 in an application near a water heater 1500. The application may include a detector 1502 that has a jack 1508. The fluid detection cable has a connector 1506 that may be plugged into the jack 1508 of the detector 1502. A leak near the water heater can be detected using the fluid detection cable and a detector. The cable may form a loop surrounding an area to be monitor so that, when the perimeter of the fluid extends to the loop of cable, it is detected. This configuration allows immediate detection of a water heater leak before major damage occurs. The fluid detection system may also be connected so as to turn off valve(s) automatically which would be well suited for applications where a building is left unoccupied for periods of time.

Figure 16:
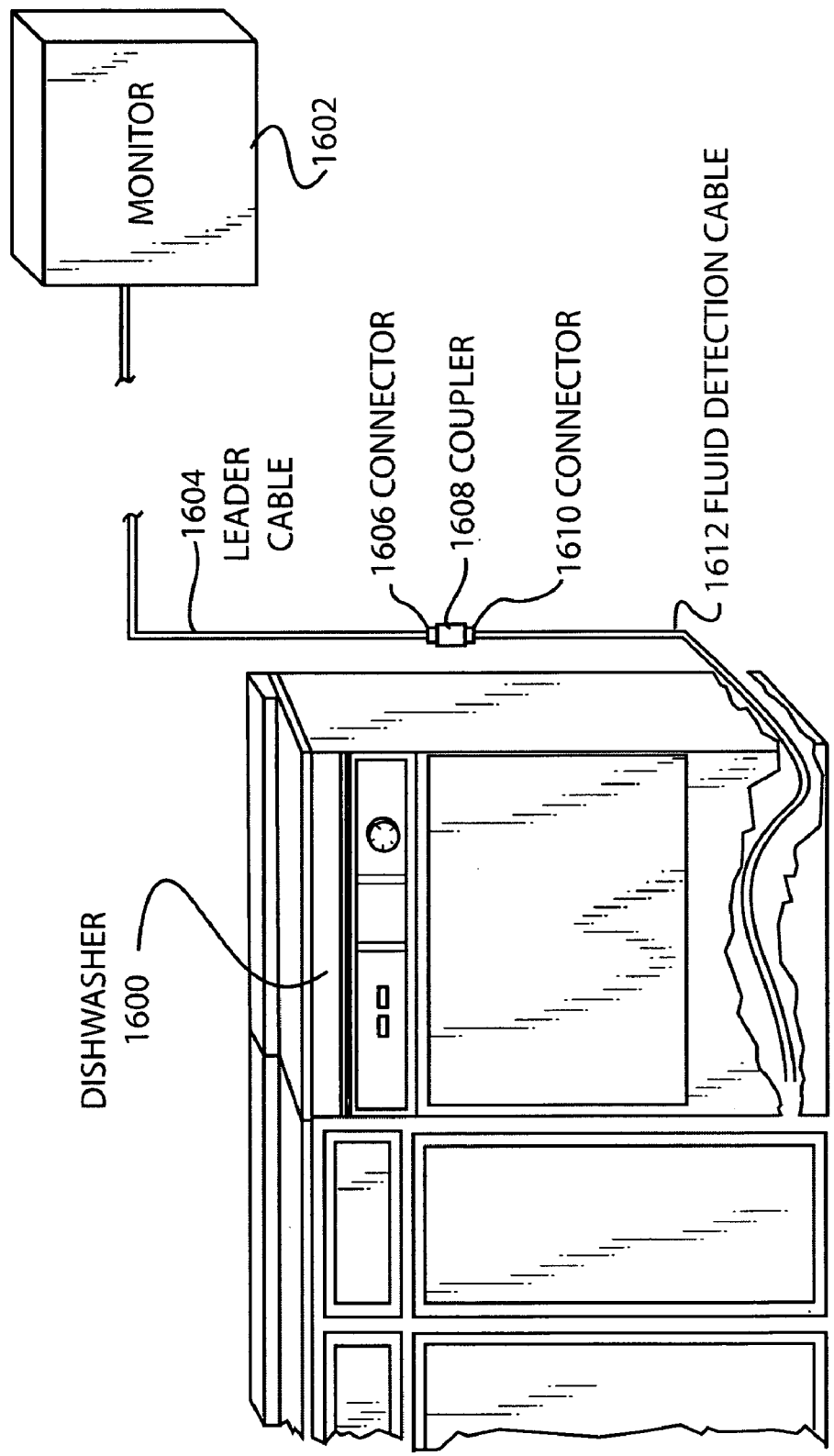
FIG. 16 illustrates the use of a fluid detection cable in another application.

FIG. 16 illustrates the use of a fluid detection cable 1612 in an application near a dishwasher 1600. The fluid detection cable 1612 has a connector 1610 that may be plugged into a coupler 1608. The porous polymer jacket surrounding the sensing leads of the fluid detection cable 1612 prevents false fluid detections from contact with the metal edges of the dishwasher. A leader cable 1604 may have a first end with a connector 1606 that may be plugged into the coupler 1608. A second opposite end of the leader cable 1604 may be connected to a monitor 1602. The flexibility and flatness of the fluid detection cable 1612 and the leader cable 1604 make them easy to install in this type of application. Leader cables and corresponding jacks may be pre-installed inside walls prior to hookup of appliances, thus facilitating installation of fluid detection cables at the time appliances are installed.

Figure 17:
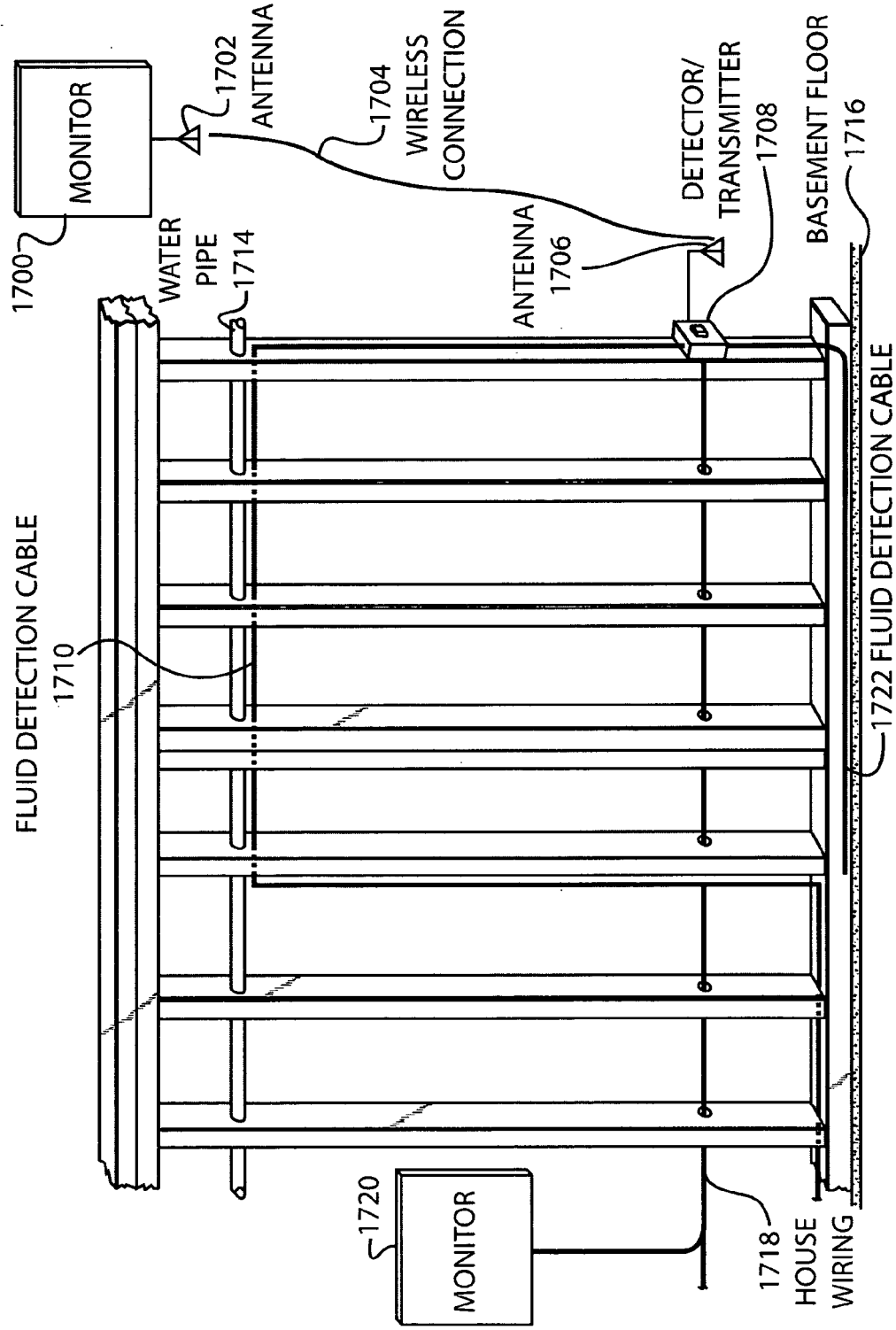
FIG. 17 illustrates the use of a fluid detection cable in another application.

FIG. 17 illustrates the use of a first fluid detection cable 1710 that is adjacent and beneath a water pipe 1714. A second fluid detection cable 1722 may be adjacent to the bottom flow plate of a wall and near to the basement floor 1716. A detector/transmitter 1708 may be connected to the first fluid detection cable 1710 and to a second fluid detection cable 1722. The detector/transmitter may have antenna 1706 that is connected to a remote first monitor 1700 and antenna 1702 via a wireless connection 1704. The detector/transmitter may transmit through house wiring 1718 to a second monitor 1720. Small leaks may thus be detected because the water will flow to the under side of the pipe and contact the fluid detection cable. Such configurations allow detection of leaks inside walls or at other remote locations. Larger leaks can be detected more quickly using this arrangement of the fluid detection cable and an alarm can be sounded so that actions such as shutting a supply valve can be taken to minimize damage. Electronically controlled valve(s) may be connected to the monitor so that when a leak is detected the monitor causes the valve(s) to shut or close.

Figure 18:
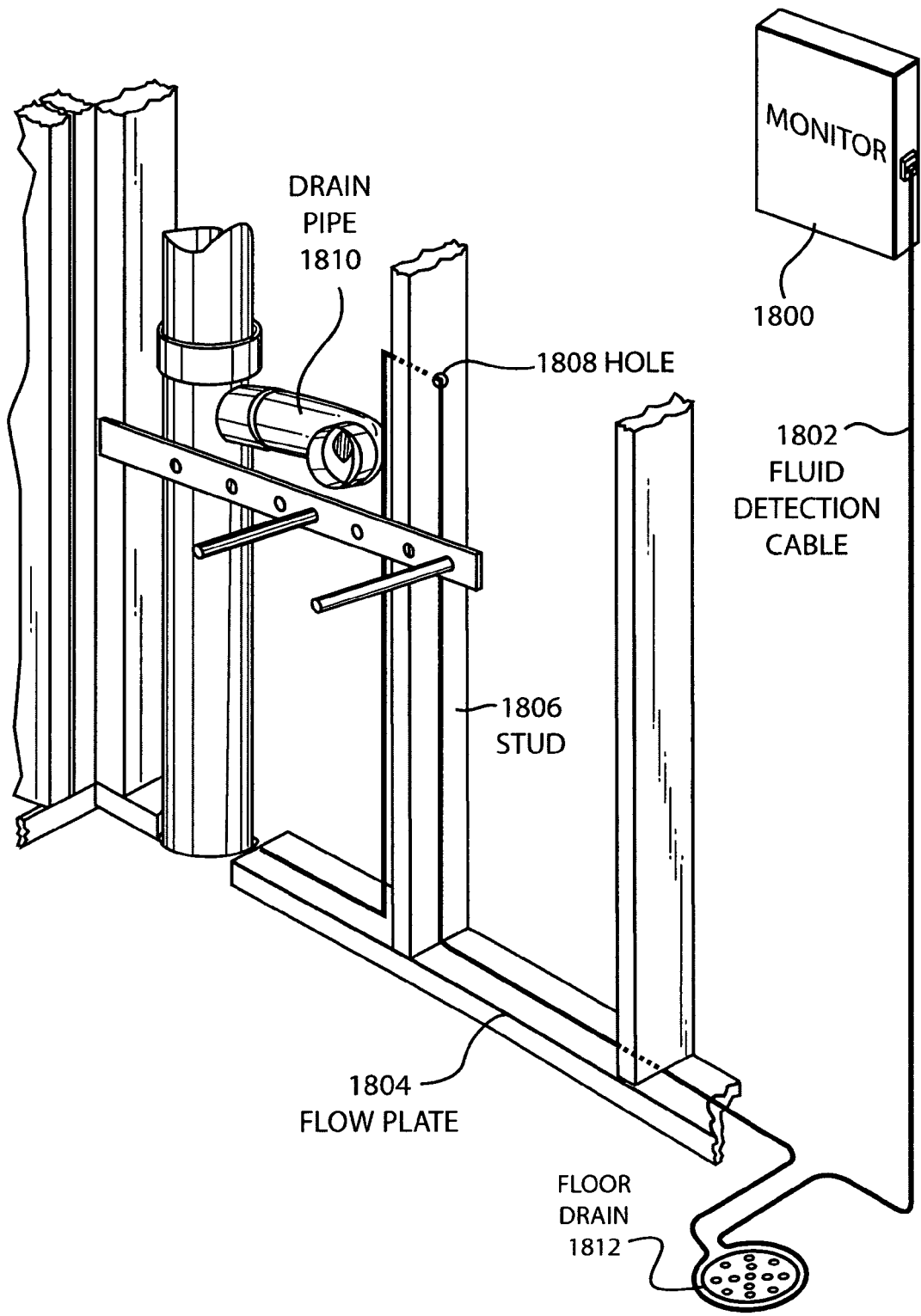
FIG. 18 illustrates the use of a fluid detection cable in another application that includes monitoring leaks from drainage pipes.

FIG. 18 illustrates the use of a fluid detection cable 1802 in an application near a drainpipe. The fluid detection cable is connected to a monitor 1800 and may be disposed on the upper surface of a flow plate 1804. The fluid detection cable may pass through a hole 1808 in a stud 1806 and then again be disposed on the upper surface of the flow plate 1804 that is below the drainpipe 1810, thus allowing the detection of leaks from a drain pipe inside a wall or at other remote locations. The fluid detection cable 1802 may form a perimeter around a floor drain 1812 as depicted in FIG. 18 such that if the floor drain 1812 is blocked and water backs up, the water will contact the fluid detection cable 1802 and the fluid can be detected.

Figure 19:
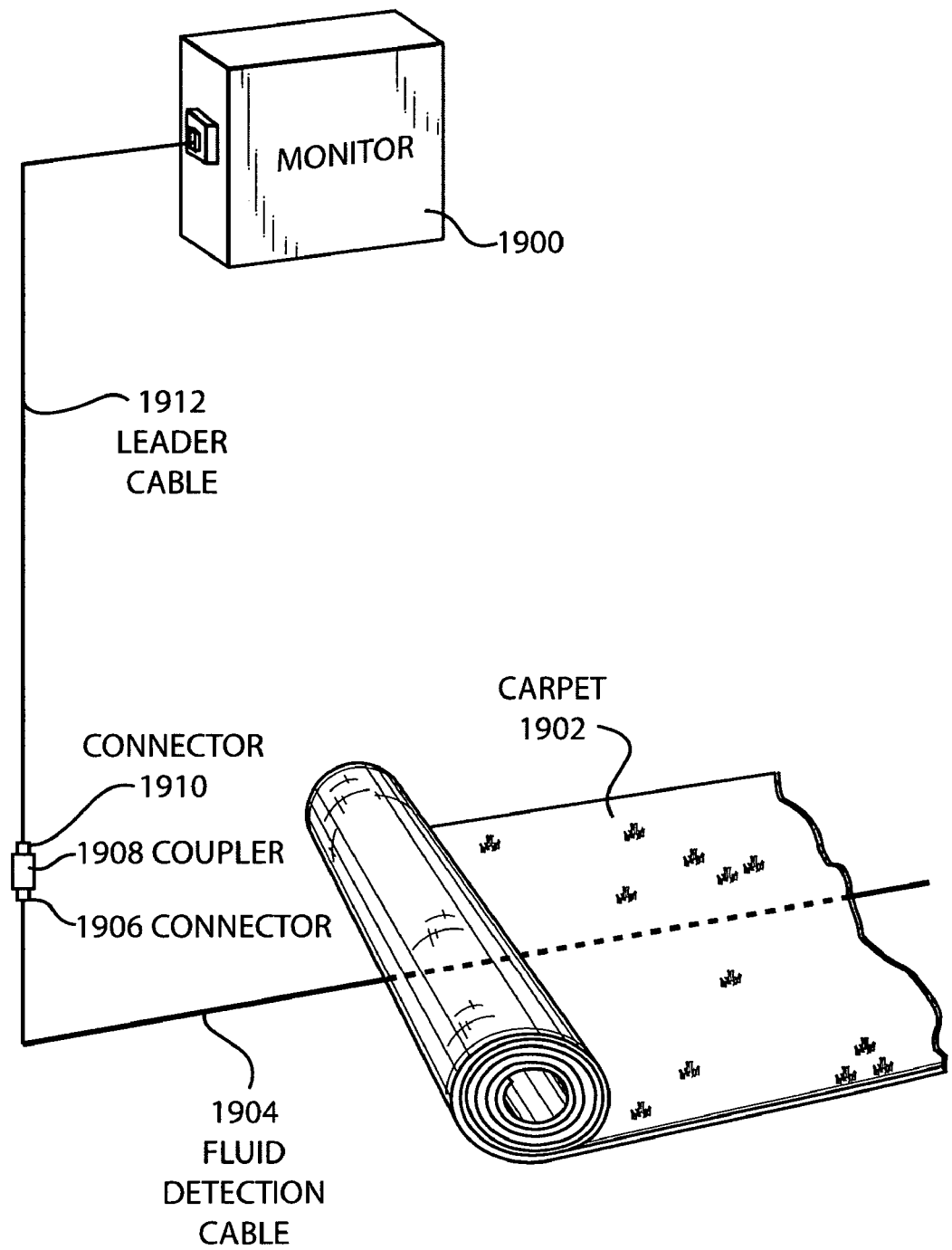
FIG. 19 illustrates the use of a fluid detection cable beneath a carpet or other floor coverings.

FIG. 19 illustrates the use of a fluid detection cable 1904 in an application where the cable is installed beneath a carpet 1902. The fluid detection cable may have a connector 1906. The connector 1906 may plug into a coupler 1908. A monitor 1900 may be connected to a leader cable 1912 that has a connector 1910 at the end farthest from the monitor. The connector 1910 may plug into the coupler 1908 and provide an electrical connection from the monitor 1900 to the fluid detection cable 1904 through connector 1906. The use of inexpensive connectors combined with the flat fluid detection cable 1904 facilitates the installation and removal of the cable beneath the carpet 1902 and eliminates bumps in the carpet 1902. Leader cables, such as leader cable 1912, may be pre-installed for more convenient construction and installation.

Figure 20:
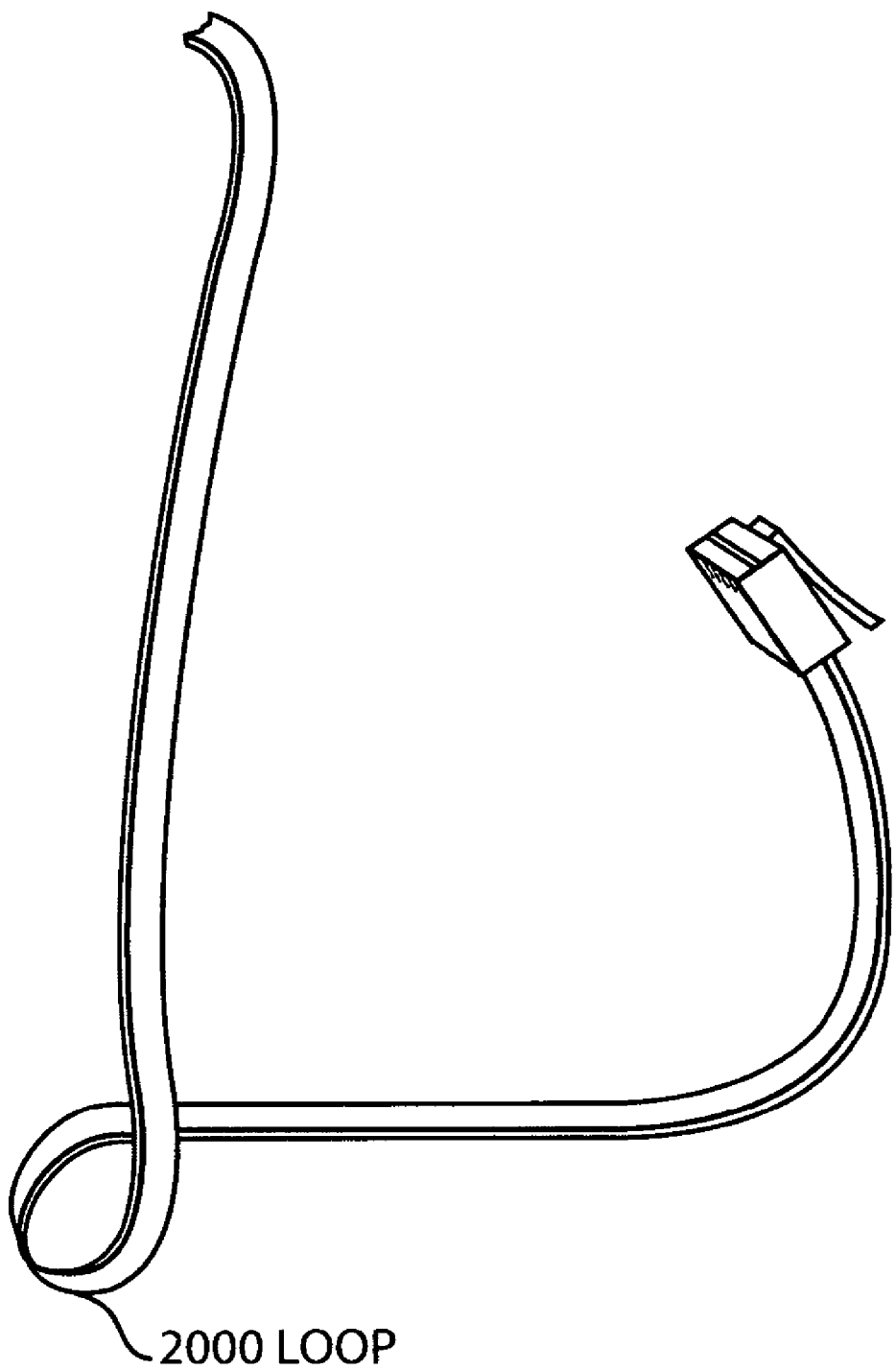
FIG. 20 illustrates the manner in which a loop can be formed with a tight turning radius of the fluid detection cable maintaining flat contact against a surface to be monitored for fluid detection.

FIG. 20 illustrates the manner in which a loop 2000 can be formed with the fluid detection cable. Existing fluid detection cables are not constructed in a manner that allows a tight turning radius. The tight turning radius and flat ribbon construction of the various embodiments of fluid detection cables disclosed herein permits the formation of a loop. The flatness or small diameter of the fluid detection cable and the tight turning radius allow the lengths of the cable extending from the loop to be placed substantially flat on a surface thus minimizing any gap between the cable and the surface that is being monitored for fluids. A larger loop may also be made that provides a spare length of cable that may be utilized if it is necessary to cut off a connector from the cable for removal or repair.

Figure 21:
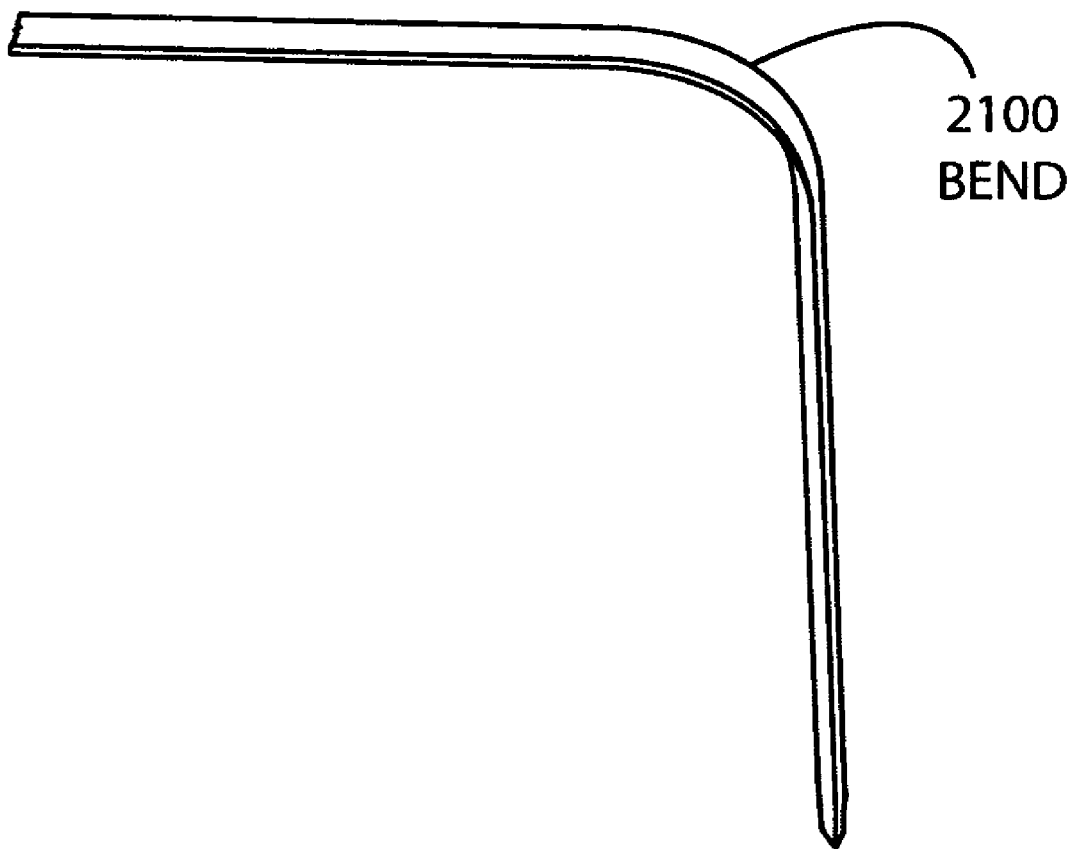
FIG. 21 illustrates the manner in which a bend can be made in the fluid detection cable for use in an application that requires a tight turning radius.

FIG. 21 illustrates a bend radius 2100. The construction, flatness and size of the various embodiments of fluid detection cables allow these cables to be installed in applications that require a tight turning radius.

Figure 22:
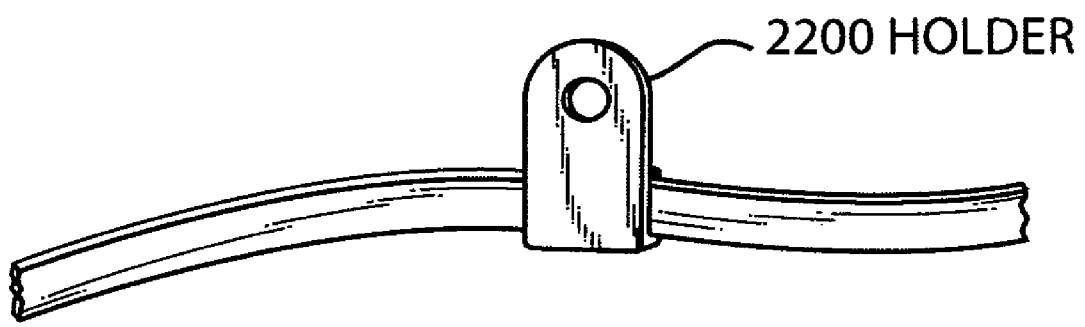
FIG. 22 illustrates a type of fastener that can be used to fasten a fluid detection cable to a surface.

FIG. 22 illustrates one embodiment of a holder 2200 that may be used to install the various embodiments of the fluid detection cable disclosed herein. A hole is formed in holder 2200 that may be used with a nail, screw, bolt or other fastening device to fasten the cable to a surface.

Figure 23:
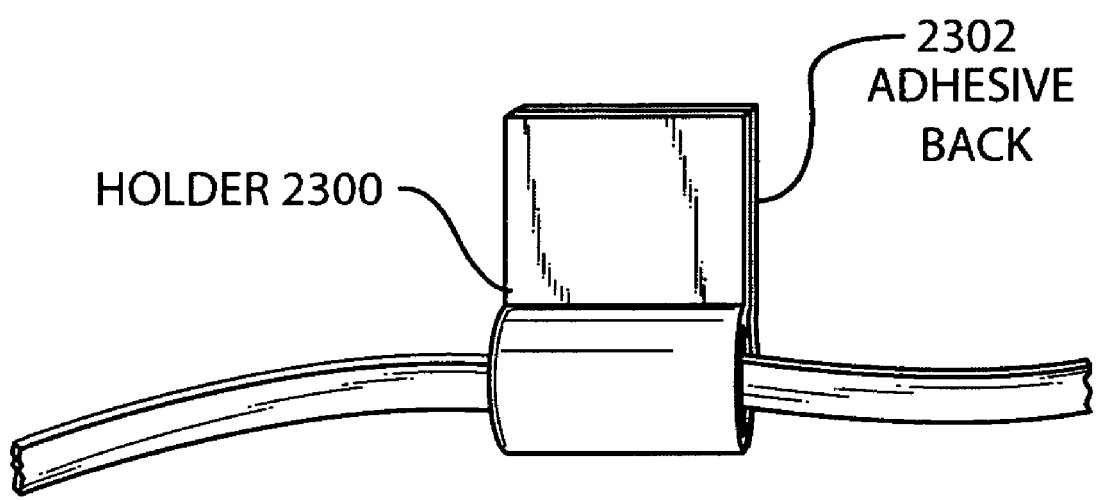
FIG. 23 illustrates another type of fastener that can be used to fasten a fluid detection cable to a surface.

FIG. 23 illustrates another embodiment of a holder 2300 that may be used to install the various embodiments of the fluid detection cable disclosed herein. The holder 2300 has an adhesive back 2302 that may be used to hold the cable to a surface in applications where it is undesirable to penetrate the surface with a fastening device.

Hence, the various embodiments of the fluid detection cable disclosed provide a cable with numerous advantages. The non-conductive polymer shielding that at least partially surrounds the conductive polymers and/or conductors provides a fluid detection cable that does not short circuit when in contact with non-liquid conductive surfaces and at the same time permits fluids to make electrical contact with the sensing leads. The conductive polymer jacket surrounding the conductors in various embodiments of the fluid detection cable protects the conductors from corrosion due to contact with corrosive fluids. The size and flatness of the various embodiments of the fluid detection cable make it easy to install and remove, especially in applications that require the fluid detection cable to be installed in tight places, locations requiring tight bends in the cable, and/or beneath carpet or other floor coverings. The size and shape of the various embodiments of the fluid detection cable disclosed is such that low cost industry standard connectors, jacks, tools and accessories may be used to connect, install and use the various embodiments of the fluid detection cable providing a significant advantage in residential or other applications that require low cost. Various embodiments of the fluid detection cable may comprise materials that facilitate the use of resistive measurement fluid detection systems or TDR systems to determine the location of the fluid.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A substantially flat four-conductor water detection cable comprising:
    a first sensing lead that has a center conductor that is at least partially surrounded by a conductive polymer ends non-conductive polymer that is porous to water and that at least partially surrounds said conductive polymer, said non-conductive polymer providing an insulating layer at least partially surrounding said conductive polymer;
    a first monitor lead that has a center conductor that is surrounded by a non-conductive polymer, said first monitor lead disposed adjacent and joined to said first sensing lead along a substantially flat plane;
    a second monitor lead that has a center conductor that is surrounded by a non-conductive polymer, said second monitor lead disposed adjacent and joined to said first monitor lead along said substantially flat plane; and
    a second sensing lead that has a center conductor that is at least partially surrounded by a conductive polymer and a non-conductive polymer that is porous to water and that at least partially surrounds said conductive polymer, said non-conductive polymer providing an insulating layer at least partially surrounding said conductive polymer, said second sensing lead disposed adjacent and joined to said second monitor lead along said substantially flat plane to form a substantially flat four-conductor water detection cable.

2. The water detection cable of claim 1 wherein said center conductors of said first and second sensing leads are resistive conductors.

3. The water detection cable of claim 1 wherein said water detection cable further comprises:
    a non-porous non-conductive polymer outer shielding that is not porous to water that surrounds said sensing leads and said monitor leads and that forms at least one trough that is capable of collecting water.

4. The water detection cable of claim 1 wherein said water detection cable further comprises:
    an adhesive strip joined to said outer shielding disposed on a side opposite to said monitor leads and sensing leads.

5. The water detection cable of claim 1 wherein said water detection cable has a size and shape that conforms to form factors for any one of a 2-conductor telephone wire, 4-conductor telephone wire and 8 conductor network cable, that simplifies wire stripping and can be used with standard telephone wire and network cable tools, connectors and jacks.

6. The water detection cable of claim 5 wherein said water detection cable further comprises:

at least one low-cost commodity connector selected from the group consisting of RJ11, RJ12, RJ14, RJ45, and ribbon cable connectors.

7. A substantially flat four-conductor water detection cable comprising:
   a first sensing lead that has a center conductor that is at least partially surrounded by a conductive polymer and a non-conductive polymer shielding that partially surrounds said conductive polymer;
   a first non-conductive polymer cover that partially covers a selected side of said conductive polymer of said first sensing lead so that said first non-conductive polymer cover and said non-conductive polymer shielding form at least one trough, said trough providing a water transmission path that allows water to electrically contact said conductive polymer by passing between said non-conductive polymer shielding and said non-conductive polymer cover, said non-conductive polymer shielding end said non-conductive polymer cover positioned so that electrical contact of a solid object with said conductive polymer is inhibited;
   at least one monitor lead that has a center conductor, said monitor lead surrounded by said non-conductive polymer shielding;
   a second sensing lead that lies a center conductor that is at least partially surrounded by a conductive polymer and said non-conductive polymer shielding that partially surrounds said conductive polymer,
   a second non-conductive polymer cover that partially covers a portion of said conductive polymer of said second sensing lead so that said second non-conductive polymer cover and said non-conductive polymer shielding form at least one trough, said trough providing a water transmission path that allows a water to electrically contact said conductive polymer by passing between said non-conductive polymer shielding and said second non-conductive polymer cover, said non-conductive polymer shielding and said second non-conductive polymer cover positioned so that electrical contact of a solid object with said conductive polymer is inhibited.

8. The water detection cable of claim 7 wherein at least one of said first non-conductive polymer cover and said second non-conductive polymer cover is a porous non-conductive polymer.

9. The water detection cable of claim 8 wherein said non-conductive polymer shielding is formed to have a right side that is an inclined plane and a left side that is an inclined plane, said inclined planes formed to permit water to climb more easily over said inclined planes.

10. The water detection cable of claim 9 wherein said center conductors of said first and second sensing leads are resistive conductors.

11. The water detection cable of claim 10 wherein said water detection cable further comprises:
   an adhesive strip joined to said non-conductive polymer shielding and disposed on a side opposite said monitor leads and sensing leads.

12. The water detection cable of claim 11 wherein said water detection cable has a size and shape that conforms to form factors for any one of a 2-conductor telephone wire, 4-conductor telephone wire and 8 conductor network cable, that simplifies wire stripping and can be used with standard telephone wire and network cable tools, connectors and jacks.

13. The water detection cable of claim 12 wherein said water detection cable further comprises:

at least one low-cost commodity connector selected from the group consisting of RJ11, RJ12, RJ14, RJ45 and ribbon cable connectors.

14. A water detection cable comprising:
   a first sensing lead that has a center conductor that is at least partially surrounded by a conductive polymer and a non-conductive polymer that at least partially surrounds said conductive polymer, said non-conductive polymer providing a water transmission path that permits water to make electrical contact with said conductive polymer, said non-conductive polymer formed so that electrical contact of a solid object with said conductive polymer is inhibited;
   a second sensing lead that has a center conductor that is at least partially surrounded by a conductive polymer and a non-conductive polymer that at least partially surrounds said conductive polymer, said non-conductive polymer providing a water transmission path that permits water to make electrical contact with said conductive polymer, said non-conductive polymer formed so that electrical contact oh solid object with said conductive polymer is inhibited.

15. The water detection cable of claim 14 wherein said water transmission path is provided by pores in said non-conductive polymer.

16. The water detection cable of claim 14 wherein said water transmission path is provided by said non-conductive polymer partially surrounding said conductive polymers that surrounds said sensing leads so that at least one trough is formed over said first sensing lead and at least one trough is formed over said second sensing lead, so that said troughs permit water to make electrical contact with said conductive polymers, said non-conductive polymer having a structure that inhibits electrical contact of a solid object with said conductive polymers.

17. The water detection cable of claim 14 wherein said water detection cable further comprises:
   at least one monitor lead that has a center conductor, said monitor lead surrounded by said non-conductive polymer.

18. A water detection cable comprising:
   a first sensing lead that has a center conductor that is at least partially surrounded by a first conductive polymer and a first non-conductive polymer that is porous to water that at least partially surrounds said conductive polymer, said first non-conductive polymer providing an insulating layer at least partially surrounding said first conductive polymer,
   a non-conductive polymer spacing member adjacent and joined to said first sensing lead; and
   a second sensing lead that has a center conductor that is at least partially surrounded by a second conductive polymer and a second non-conductive polymer that is porous to water that at least partially surrounds said second conductive polymer, said second non-conductive polymer providing an insulating layer at least partially surrounding said second conductive polymer, said second sensing lead disposed adjacent and joined to said spacing member.

19. The water detection cable of claim 18 wherein said non-conductive polymer spacing member is joined to said first sensing lead and said second sensing lead so as to form a trough that is capable of collecting water.

20. The water detection cable of claim 19 wherein said water detection cable further comprises:
   at least one monitor conductor that is embedded in said non-conductive polymer spacing member.

21. A water detection cable comprising:
a first sensing lead that has a first conductor that is at least partially surrounded by a first conductive polymer and a first non-conductive polymer that is porous to water and that at least partially surrounds said first conductive polymer, said first non-conductive polymer providing an insulating layer at least partially surrounding said first conductive polymer;
a second sensing lead that has second conductor that is at least partially surrounded by a second conductive polymer and a second non-conductive polymer that is porous to water and that at least partially surrounds said second conductive polymer, said second non-conductive polymer providing an insulating layer at least partially surrounding said second conductive polymer;
a non-conductive polymer spacing member adjacent and joined to said first sensing lead, said non-conductive polymer spacing member joined to said first sensing lead and said second sensing lead so as to form a trough that is capable of collecting water; and
at least one monitor conductor that is embedded in said non-conductive polymer spacing member.

22. A method of constructing a water detection cable comprising:
providing a first sensing lead that has a conductor that is at least partially surrounded by a first layer conductive polymer, said first layer conductive polymer at least partially surrounded by a second layer non-conductive polymer, said non-conductive polymer having at least one water transmission path that permits water to contact said conductive polymer;
providing a first monitor lead that has a conductor that is surrounded by a non-conductive polymer, said first monitor lend being joined to said first sensing lead along a longitudinal axis of said first sensing lead;
providing a second monitor lead that has a conductor that is surrounded by a non-conductive polymer, said second monitor lead being joined to said first monitor lead along a longitudinal axis of said first monitor lead; and
providing a second sensing lead chat has a conductor that is at least partially surrounded by a first layer conductive polymer, said first layer conductive polymer being at least partially surrounded by a porous non-conductive polymer, said second sensing lead being joined to said second monitor lead along a longitudinal axis of said second monitor lead.

23. A water detection cable comprising:
a first sensing lend that has a first conductor that is at least partially surrounded by a first conductive polymer and a first non-conductive polymer that is porous to water and that at least partially surrounds said first conductive polymer, said first non-conductive polymer providing an insulating layer at least partially surrounding said first conductive polymer;
a first monitor lead that has a conductor that is surrounded by said non-conductive polymer;
a second monitor lead that has a conductor that is surrounded by said non-conductive polymer; and
a second sensing lead that has a second conductor that is at least partially surrounded by second conductive polymer and a second non-conductive polymer that is porous to water and that at least partially surrounds said second conductive polymer, said porous non-conductive polymer providing an insulating layer at least partially surrounding said conductive second polymer.

* * * * *